United States Patent
Wang et al.

(10) Patent No.: US 11,902,811 B2
(45) Date of Patent: Feb. 13, 2024

(54) MULTI-BAND WI-FI FUSION FOR WLAN SENSING

(71) Applicant: Mitsubishi Electric Research Laboratories, Inc., Cambridge, MA (US)

(72) Inventors: Pu Wang, Cambridge, MA (US); Jianyuan Yu, Blacksburg, VA (US); Toshiaki Koike Akino, Belmont, MA (US); Ye Wang, Andover, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 17/218,242

(22) Filed: Mar. 31, 2021

(65) Prior Publication Data

US 2022/0286885 A1    Sep. 8, 2022

Related U.S. Application Data

(60) Provisional application No. 63/157,918, filed on Mar. 8, 2021.

(51) Int. Cl.
*H04W 24/00* (2009.01)
*H04W 72/0453* (2023.01)
(Continued)

(52) U.S. Cl.
CPC .......... *H04W 24/10* (2013.01); *H04B 17/309* (2015.01); *H04W 4/38* (2018.02);
(Continued)

(58) Field of Classification Search
USPC ........................................................ 370/252
See application file for complete search history.

(56) References Cited

U.S. PATENT DOCUMENTS 10,856,110 B1    12/2020  Dell
11,202,243 B2 *  12/2021  Dash ..................... H04W 40/02
(Continued)

*Primary Examiner* — Gregory B Sefcheck
*Assistant Examiner* — Majid Esmaeilian

(57) ABSTRACT

A system for fusion of Wi-Fi measurements from multiple frequency bands to monitor indoor and outdoor space is provided. The system includes a multi-band wireless network comprising a set of radio devices to provide coverage in an environment, wherein the set of radio devices are configured to establish wireless communication or sensing links over multi-band wireless channels, wherein the multi-band wireless channels use a first radio band at a millimeter wavelength and a second radio band at a centimeter wavelength. The system further includes a computing processor communicatively coupled to the set of radio devices and a data storage, wherein the data storage has data comprising a parameterized model, modules and executable programs. The computing processor is configured to receive measurement data over the multi-band wireless channels to obtain a set of heterogeneous sensor data, network transferred data, or wireless channel attribute data, fuse at least two types of measurements from the first and the second radio bands at one or more steps in a parameterized model to generate an estimated environmental state in the environment.

14 Claims, 22 Drawing Sheets

(51) Int. Cl.
  *H04W 4/38*   (2018.01)
  *H04B 17/309* (2015.01)
  *H04W 16/20*  (2009.01)
  *H04W 24/10*  (2009.01)
  *H04W 84/12*  (2009.01)

(52) U.S. Cl.
  CPC ....... *H04W 16/20* (2013.01); *H04W 72/0453* (2013.01); *H04W 84/12* (2013.01)

(56) References Cited

U.S. PATENT DOCUMENTS

| | | | |
|---|---|---|---|
| 11,303,309 B1* | 4/2022 | Mobarak | H03F 1/301 |
| 2017/0325137 A1* | 11/2017 | Decarreau | H04W 76/15 |
| 2018/0159607 A1* | 6/2018 | Rybakowski | H04B 7/0617 |
| 2018/0220308 A1* | 8/2018 | Miao | H04W 36/0085 |
| 2019/0020121 A1* | 1/2019 | Paulotto | H01Q 21/28 |
| 2020/0015047 A1* | 1/2020 | Song | H04W 4/026 |
| 2021/0119346 A1* | 4/2021 | Sur | H01Q 1/243 |
| 2021/0190702 A1* | 6/2021 | Wu | G01S 7/411 |
| 2022/0108680 A1* | 4/2022 | Zhang | G10L 13/027 |

\* cited by examiner

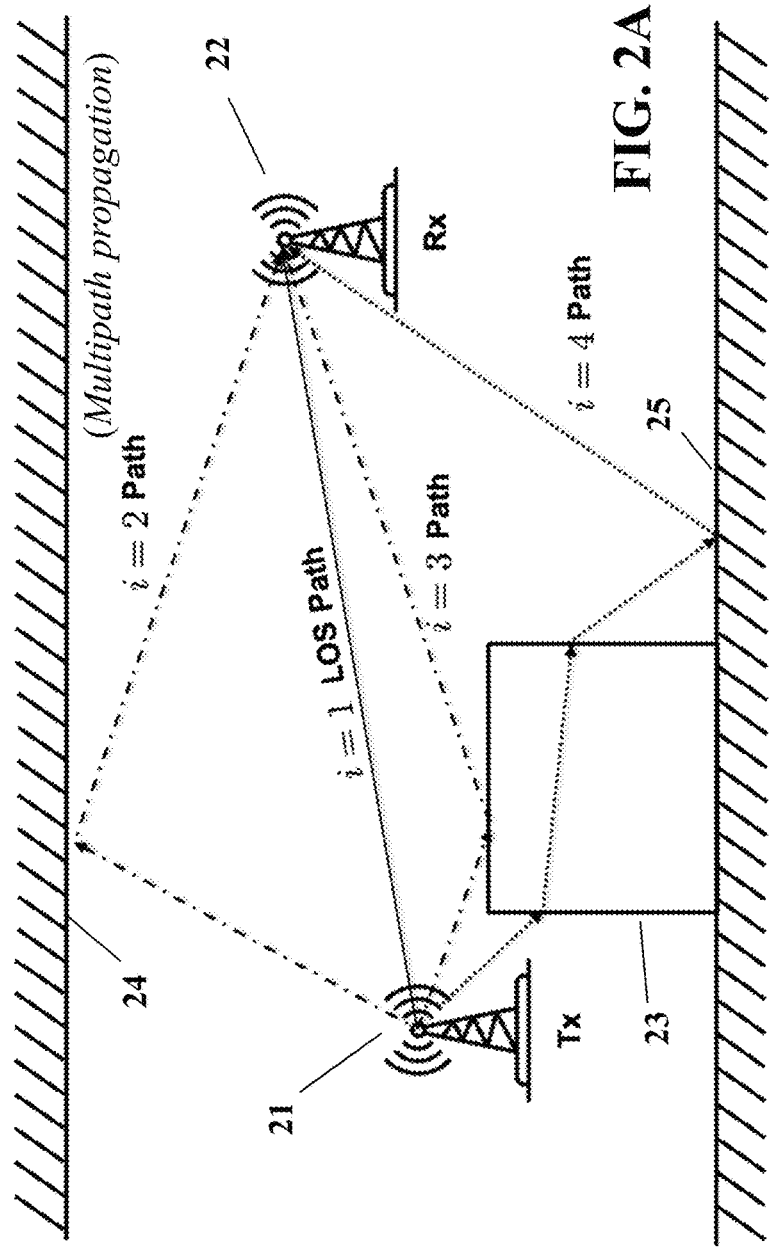
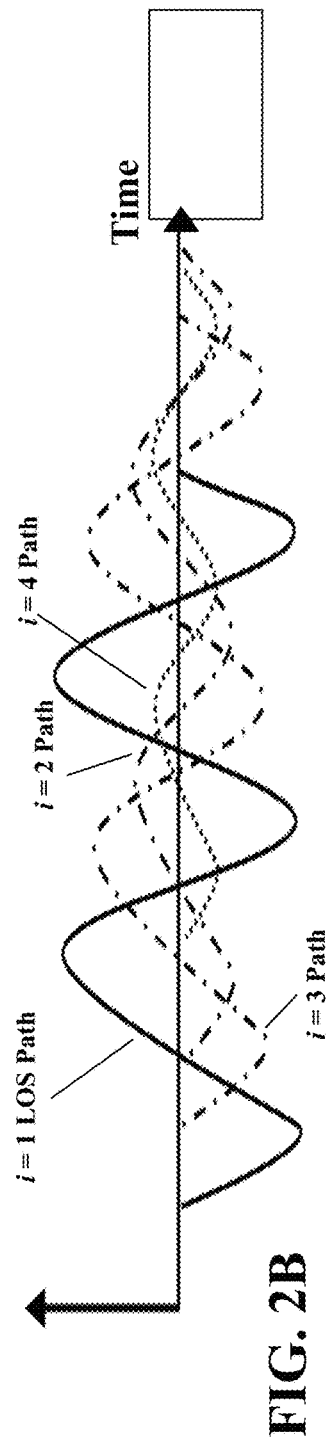
FIG. 2A
FIG. 2B

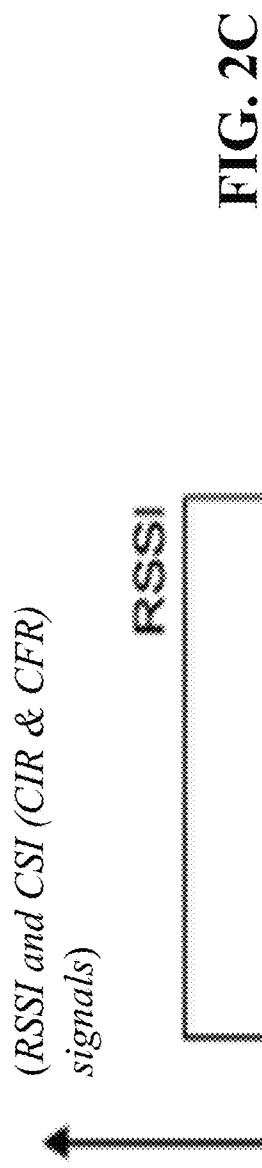
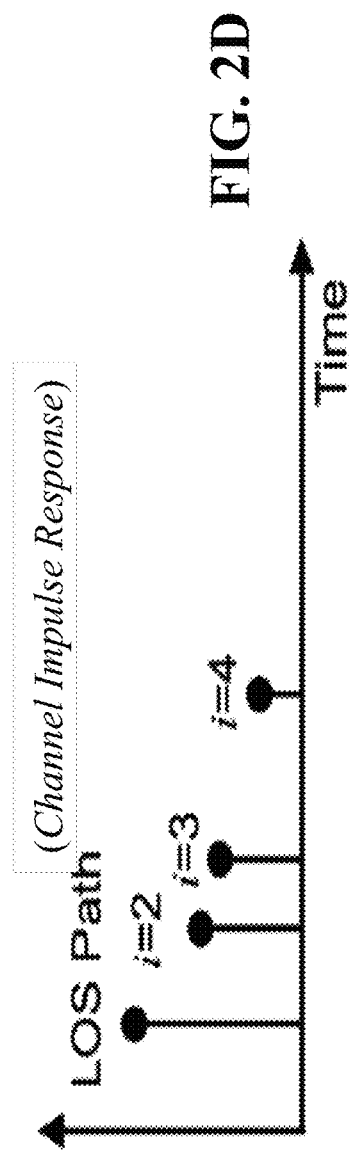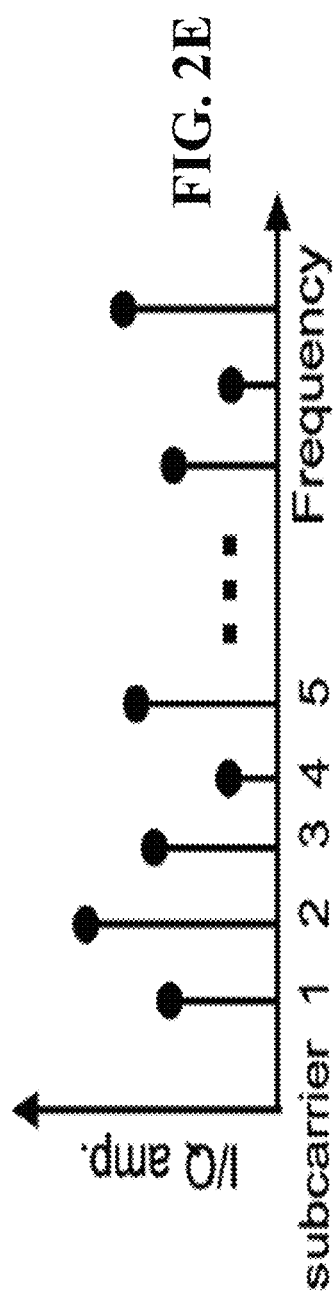
FIG. 2C
FIG. 2D
FIG. 2E

Unsupervised training for feature extraction and multi-granularity matching/fusion blocks Con'd

MULTI-BAND WI-FI FUSION FOR WLAN SENSING

FIELD

The present disclosure relates generally to communications systems, and more particularly to fusion of Wi-Fi measurements from multiple frequency bands to monitor indoor and outdoor space without relying on dedicated sensors.

BACKGROUND

Wi-Fi sensing or wireless local-area-network (WLAN) sensing has received tremendous attention over the past decade. More recently new work groups are focusing on WLAN sensing for making greater use of 802.11 standard technologies towards new industrial and commercial applications. Some conventional WLAN sensing frameworks use either channel state information (CSI) from the physical (PHY) layer or received signal strength indicator (RSSI) measurements from the medium access control (MAC) layer. The conventional RSSI measurement suffers from the measurement instability and coarse granularity of the channel information, leading to limited accuracy for sensing. The conventional CSI measurement has higher granularity for sensing, while it requires access to PHY-layer interfaces and high computational power to process a large amount of sub-carrier data.

As one of WLAN sensing applications, the technical field of indoor localization deals with developing systems and methods for localizing an object in an enclosed indoor area. The object can be a device that transmits and/or receives signals to/from some other device(s), or an entity without such a capability. The localizing refers to estimating the coordinates of an object in some pre-defined reference frame. A number of indoor localization industry applications require precise indoor localization, such as locating objects, in hospitals, warehouses, shopping malls, factories, to name a few. Some conventional indoor localization approaches require the installation of dedicated hardware in an indoor area. However, these types of conventional approaches are undesirable due to having to buy and then install the dedicated hardware into the indoor localization system. An example of this approach is ultra-wide band (UWB) radio localization systems which are expensive and are used as a last resort option for the indoor localization community. Other examples include systems based on light detection and ranging (LIDAR), radar or ultrasound, requiring high installation and maintenance cost likewise UWB localization systems. In the area of millimeter-wave (mmWave) communications, a system described in CN102914762A discloses an mmWave-based indoor localization system. However, that system described in the CN102914762A reference requires installation of a dedicated infrastructure operating at mmWave frequencies, and thus it is undesirable for some practical applications.

Therefore, there is a need for WLAN sensing (e.g., indoor localization) systems and methods that can construct a feature space for a fingerprinting database, from low cost and implementation perspectives, as well as fusion of Wi-Fi measurements from multiple frequency bands to monitor indoor and outdoor space without relying on dedicated sensors (e.g., camera, Lidar, radar, ultrasound, infrared), that can be used for both device-carrying and device-free monitoring.

SUMMARY OF THE INVENTION

The present disclosure relates generally to communications systems, and more particularly to fusion of Wi-Fi measurements from multiple frequency bands to monitor indoor and outdoor space without relying on dedicated sensors. These systems and methods can be used to monitor indoor and outdoor spaces without relying on external dedicated sensors (e.g., camera, Lidar, radar, ultrasound, infrared), and can be used for both device-carrying and device-free indoor and outdoor monitoring.

Some embodiments of the present disclosure utilize infrastructure-free WLAN sensing that construct a feature space for a class-dependent fingerprinting database, by fusing Wi-Fi measurements from multiple frequency bands. These embodiments operate with a multi-band Wi-Fi network includes, for example, 802.11ac- and 802.11ad-compliant Wi-Fi devices. The multiple frequency bands can include fine-grained channel measurements such as the channel state information (CSI) in the form of complex amplitudes over a set of frequency subcarriers on a span of up to 80-MHz bandwidth, super-grained channel measurements such as the CSI over a span of over 1-GHz bandwidth, and mid-grained channel measurements in the form of spatial beam signal-to-noise ratios (SNRs) at 60-GHz operating frequency.

Specifically, some embodiments fuse fine-grained channel state information (CSI) measurements at sub-6 GHz from multiple spatial streams and mid-grained beam SNRs at mmWave band of 60 GHz. Both kinds of Wi-Fi channel measurements provide rich yet complementary features at different physical domains. As complex-valued amplitudes at orthogonal frequency-division multiplexing (OFDM) sub-carrier tones, the CSI measurements are capable to obtain to the power delay profile (PDP) in the time-domain and reflects the power distribution along propagation paths in the local area. On the other hand, the beam SNRs measurements are more indicative of spatial-domain channel measurements over various beamforming directions or beam-space.

Aspects of the present disclosure are based on a realization gained from experimentation that fuses two rich Wi-Fi channel measurements at different frequency bands, i.e., the multi-band Wi-Fi fusion between the fine-grained CSI measurements at sub-7 GHz and the mid-grained beam SNRs at the mmWave band of 60 GHz. For example, these two Wi-Fi channel measurements provide much richer features compared with the scalar coarse-grained RSSI and can lead to more meaningful fusion with the fine-grained CSI. Specifically, these features are complementary to each other: 1) frequency subcarriers versus spatial beam sectors, and 2) high environmental sensitivity over longer distances versus relatively medium environmental sensitivity over short distances.

Another realization gained from experimentation was the need for developing an autoencoder-based fusion network that can include separate encoders (i.e. CSI encoder and beam SNR encoder), and decoders (i.e. CSI decoder and beam SNR decoder). This fusion network can be first trained using a reconstruction error on outputs of two decoders having the same fused features as their inputs. Such that the fusion network can reconstruct the CSI and beam SNRs from the same fused features. This unique fusion network solves the technical problems: (1) granularity correspondence of multi-band measurements is not unknown; (2) raw high-dimensional multi-band measurements are cost-ineffective to use, process and store; (3) analyzing the multi-band measurements requires a large amount of training labels to train for WLAN sensing; and (4) the measurements database are restricted to one specific application of localization and have a limited generalizability to other applications such as pose and behavior monitoring.

Further, the technical solution is to introduce a customized fusion block that accounts for granularity correspondence among features over multiple levels from the two types of Wi-Fi channel measurements. The granularity correspondence can be incorporated by a feature permutation network or a feature attention network which is trained using unlabeled training data. To address the generalizability and relax the requirement of large labeled training data, an autoencoder-based unsupervised fusion network is used for multi-task sensing datasets. Once the autoencoder-based fusion network is trained, it can be fine-tuned using limited labeled training data for specific tasks.

The technical benefits created by the technical solution include 1) granularity matching fusion between two distinct Wi-Fi channel measurements; 2) relax the requirement of large labeled training; and 3) improve the generalizability for multi-task sensing.

Architects designing and creating sensing networks as conventionally known would not think, or need, a fusion network of the present disclosure, since the conventional WLAN sensing or fusion networks cannot extract meaningful features from the coarse-grained RSSI channel measurements.

What was also later realized after many test experiments is due to unknown granularity correspondence between the CSI and beam SNR encoders, a customized fusion block can be introduced to hierarchically fuse the features from different levels. Specifically, this fusion block considers the feature permutation for granularity matching. Wherein, the unknown granularity correspondence between the CSI and beam SNR encoders may prevent a beneficial fusion between the two measurements. In fact, simple fusion of two channel measurements with different physical meanings and qualities may lead to worse performance than the better performance of the two stand-alone channel measurements. Some of the challenges in developing the fusion block included 1) the novel correspondence matching methods; 2) limited labeled training; and 3) generalization for multi-task WLAN sensing. This is a unique problem, the problem of unknown granularity correspondence between the CSI and beam SNR encoders, and is specific to fusing one type of measurement from a first radio band or mid-grained beam signal to noise ratio (SNR) measurements at a mmWave band of 60 GHz with another type of measurement from a second radio band or fine-grained channel state information (CSI) measurements at sub-6 GHz from multiple spatial streams. For example, conventional WLAN sensing frameworks may fuse signals by a simple concatenation of two channel measurements which is completely different than fusing mid-grained beam signal to noise ratio (SNR) measurements at a mmWave band of 60 GHz with fine-grained channel state information (CSI) measurements at sub-6 GHz from multiple spatial streams over different feature levels.

Another realization realized from experimentation and incorporated into some embodiments after the completion of training the fusion network, includes using the pretrained fusion network to attach multi-task heads to the fused features by fine tuning the fusion block and training the multi-task heads from the scratch. This approach can relax the requirement on the number of labeled training data which is hard to obtain for WLAN sensing, particularly after the device deployment. Some aspects as why being able to attach the multi-task heads to the fused features is important is because 1) the fused features have good generalization capability; and 2) the multi-task heads are easier to train even with limited labeled data.

Practical Applications

The embodiments of the present disclosure address some of today's residential, industrial, and commercial applications simply because these systems and methods can be used to monitor indoor spaces without dedicated sensors (e.g., camera, Lidar, radar, ultrasound, infrared), and can be used for both device-carrying and device-free indoor monitoring. Further, these systems and methods operate with a multi-band Wi-Fi network consisting of, for example, 802.11ac- and 802.11ad-compliant Wi-Fi routers, which allows the systems and methods to be able to be incorporated into many different types of applications. Further, these systems and methods can be used for applications including indoor localization of static and moving objects with or without communication devices (device-free). For example, these systems and methods of the present disclosure are configured for many different types of applications including human activity recognition, pose recognition, occupancy monitoring, people counting, indoor traffic, indoor localization, outdoor localization, robot, indoor navigation, indoor parking assistance, proximity detection, etc. Other applications can include home security, entertainment, energy management (HVAC, light, device power savings), elderly care, and assisted living.

Still further, the systems and methods are designed to address asset and people tracking within a controlled environment like a corporate campus, a hospital facility, or a shipping yard. Specifically, the systems and methods can be configured to monitor exact locations of objects and living and non-living things. For example, a crash cart within a hospital so that when there is a cardiac arrest or some other life threating event, the hospital staff does not waste time locating the crash cart or some other vital device.

Further practical features of the present invention are described below. Wi-Fi sensing or wireless local-area-network (WLAN) sensing has received tremendous attention over the past decade. In addition to the main objective of Wi-Fi coverage, some embodiments are based on understanding that it can be advantageous to use WLAN sensing to estimate the state of the environment in the areas covered by the Wi-Fi signals. As used herein, the state of the environment is indicative of states or a change of the states of objects and/or people located within the environment. The environment can include indoor and outdoor spaces covered by the Wi-Fi-signals. Further, the state of the environment can be used in many different applications, such as tracking, security, and control applications.

Some embodiments are based on a recognition that the state of the environment can be determined from properties of Wi-Fi signals, e.g., channel state information (CSI) of channels of propagation of the Wi-Fi signals. However, some embodiments are based on understanding the properties of some Wi-Fi signals can provide insufficient information for estimating the environment with desired accuracy and efficiency suitable for some practical applications. For example, for some Wi-Fi signals, neither properties of the Wi-Fi signal estimated by the physical (PHY) layer of communication protocol nor properties of the Wi-Fi signal estimated by the medium access control (MAC) layer, such as a received signal strength indicator (RSSI), may not provide sufficient information to estimate the state of the environment with the desired accuracy.

At the first glance, the cause of this accuracy problem is in a type of information extracted from the Wi-Fi channel by different layers of communication protocol. However, some embodiments are based on a recognition that the cause of this problem is not in the type of information but in the physical properties of the Wi-Fi signal itself and/or the properties of propagation of the Wi-Fi signal. Specifically, depending on the frequency of a Wi-Fi signal, the signal can change the distance of propagation, types of multi-path propagation, the ability of object penetrations, sensitivity to motion of the objects and the people, and the like. For different sensing applications, different types of Wi-Fi signals can be more or less beneficial. To that end, it may be reasonable to select different types of Wi-Fi signals for different applications depending on the interest in the state of the environment. However, such a selection is impractical.

Some embodiments are based on the realization that different kinds of Wi-Fi signals can be used for estimating the state of the environment not individually but jointly. Specifically, different Wi-Fi signals can propagate on different frequency bands sufficiently disjoint to have different properties of their corresponding channels. An example of such a multi-band transmission is the transmission of Wi-Fi signals of millimeter-wavelength and centimeter-wavelength. Moreover, some embodiments are based on a recognition that some modern access point (AP) can provide such a multi-band transmission to cover the same area or environment. For example, some Wi-Fi devices compliant with 802.11ac and 802.11ad communication standards provide such a multi-band transmission on a centimeter-wavelength channel with frequencies at sub-7 GHz and on a millimeter-wavelength channel at mmWave band of 60 GHz.

To that end, it is an object of some embodiments to use multi-channel information of multi-band Wi-Fi transmission that provides Wi-Fi coverage of an environment over a centimeter-wavelength channel and a millimeter-wavelength channel to estimate a state of the environment. The joint usage of multi-channel information of multi-band Wi-Fi transmission enhances the quality of estimation of the state of the environment in a computationally efficient manner.

Accordingly, some embodiments can be realized by base on feature 1 as follows. Feature 1: a system for estimating a state of an environment based on multi-channel information of a multi-band Wi-Fi transmission that provides Wi-Fi coverage of an environment over a centimeter-wavelength channel and a millimeter-wavelength channel In this case, the system may include at least one processor; and memory having instructions stored thereon that, when executed by the at least one processor, cause the system to: receive the multi-channel information of the multi-band Wi-Fi transmission including one or multiple properties of the centimeter-wavelength channel and one or multiple properties of the millimeter-wavelength channel; determine the state of the environment using jointly the properties of the centimeter-wavelength channel and the properties of the millimeter-wavelength channel; and submit the state of the environment to a service provider arranged to perform a task to service the environment.

The same or different properties of different channels of the multi-band Wi-Fi transmission can be used by different embodiments. However, some embodiments are based on a recognition that it can be advantageous to reuse the properties of different Wi-Fi channels estimated for the needs of Wi-Fi coverage. In such a manner, the state estimation can reuse the existing measurements without increasing the computational burden on Wi-Fi coverage operations.

For example, various Wi-Fi devices with centimeter-wavelength transmissions estimate channel state information (CSI) of their channels for the Wi-Fi coverage. In contrast, various Wi-Fi devices using millimeter-wavelength transmissions estimate signal-to-noise ratios (SNRs) of spatial beams probed for effective beamforming transmission. Some embodiments are based on realization proved by experiments that this information determined anyway for Wi-Fi coverage is sufficient to improve the quality of estimation of the state of the environment if utilized jointly.

Feature 2: As an additional feature for the system having Feature 1, the properties used for joint estimation of the state of the environment may include a channel state information (CSI) of the centimeter-wavelength channel and signal-to-noise ratios (SNRs) of different spatial beams transmitted over the millimeter-wavelength channel with different angles of departure (AoD).

The system for estimating a state of an environment employing principles of different embodiments can be arranged at different places. For example, in one embodiment, the system is integrated into a Wi-Fi router that is configured for multi-band Wi-Fi transmission. In this embodiment, the system is connected to one or multiple Wi-Fi transceivers connected to one or multiple antennas to transmit and receive Wi-Fi signals on different frequency bands and/or to various circuitries of the Wi-Fi router configured to estimate the properties of different channels based on Wi-Fi transmission. This embodiment integrates different functionality of Wi-Fi coverage into a single device.

The single device that integrates different functionality can be represented by Feature 3 as follows.

Feature 3: a Wi-Fi device configured to perform one or a combination of functions including a function of a router, a function of a wireless access point, and a function of providing access to the Internet or a private computer network. In this case, the Wi-Fi device may include one or multiple Wi-Fi transceivers connected to one or multiple antennas to transmit and receive Wi-Fi signals on different frequency bands including the centimeter-wavelength channel and the millimeter-wavelength channel and to estimate the properties of different channels for performing the multi-band Wi-Fi transmission; and the system having Feature 1 that is operatively connected to the Wi-Fi transceivers to receive the properties of different channels of the multi-band Wi-Fi transmission.

In different embodiments, the system employing the principles of some embodiments is arranged on a device served by the Wi-Fi coverage or a remote device located outside of the environment, such as a cloud-based server. The systems implemented according to these embodiments are decoupled from the estimation of the properties of the channels. This can be advantageous when it is desired to reuse legacy routers and/or when it is desired to collect channel information from multiple routers. In these embodiments, the properties of different channels of the multi-band Wi-Fi transmission are received over a wireless communication channel, such as a radio frequency (RF) communication channel Accordingly, this feature can be represented by Feature 4 as follows.

Feature 4: the system having Feature 1 may further comprise a transceiver configured to receive the properties of different channels of the multi-band Wi-Fi transmission over a wireless communication channel Some embodiments are based on a recognition that the estimation of the state of the environment can be performed on the received properties of different channels analytically using various signal models. Additionally or alternatively, some embodiments are based on a realization that the state of the environment can be learned using various machine learning techniques. Besides the proven efficiency of machine learning, the learned state estimators can operate not only on the properties of the channels but on features extracted from the properties. Considering the different types of channels and different types of properties of the channels, joint estimation of the state of the environment from the features provides a better possibility for unification and fusion of different information.

Feature 5: The system of Feature 1, wherein to estimate the state of the environment, the processor is configured to execute a neural network including multiple subnetworks, wherein the subnetworks comprise a first feature extraction subnetwork trained to extract features from the properties of the centimeter-wavelength channel to produce first features; a second feature extraction subnetwork trained to extract features from the properties of the millimeter-wavelength channel to produce second features; a fusion subnetwork trained to combine or fuse the first features and the second features to produce fused features; and a state estimator subnetwork trained to estimate the state of the environment from the fused features.

Such a neural network can be trained online or offline based on the knowledge of the state of the environment. Additionally or alternatively, such a neural network can be trained end-to-end in a task-specific manner, e.g., based on a state of execution of the task. This embodiment can be advantageous when the training information about the state of execution of the task is more available than training information of the state of the environment, and, thus, the state of the execution of the task can be used for training purposes. For example, if the execution of the task is to control a robot, the state of the robot can be measured by various sensors specific to the robot and used for the training. In addition, such task-specific training allows extracting features from the properties of the channels beneficial to that task. This feature can be represented by Feature 6 below.

Feature 6: The system including Feature 5, wherein the neural network further comprises: a task executor subnetwork trained to execute the task servicing the environment based on the state of the environment determined by the state estimators.

Some embodiments are based on a recognition that sometimes the system needs to estimate the state of the environment to perform multiple tasks to serve the environment. Naturally, when the neural network is trained for a specific task, different neural networks can be trained for different tasks and employed by the system selectively based on the desired task. This approach can be beneficial when specialized training is desired. However, some embodiments are based on understanding that the feature extraction, fusion, and state estimation can be performed in consideration of multiple tasks. To that end, some embodiments use a multi-head neural network having multiple task executor subnetworks connected to receive the estimation of the state of the environment from the state estimator subnetwork. Each task executor subnetwork is trained end-to-end for a specific task jointly with other task executor subnetworks. In such a manner, the neural network is trained to extract, fuse and use the fused features suitable for the performance of multiple tasks. Such a system can be represented by Feature 7 as follows.

Feature 7: The system having Feature 5, wherein the neural network is a multi-head neural network, further comprises multiple task executor subnetworks jointly trained for the execution of different tasks, each task executor subnetwork is trained to execute a corresponding task based on the state of the environment determined by the state estimators.

In different embodiments, the fusion subnetwork is structured and arranged differently to fuse different features in a different manner. For example, in some implementations, the fusion subnetwork combines the first features of the centimeter-wavelength channel and the second features of the millimeter-wavelength channel in a tensor, vector, or matrix for subsequent processing. In different implementations, the fusion subnetwork includes multiple layers to better fuse different features. For example, a pattern of the different layers of the fusion subnetwork can form a U-shape to reduce the dimensionality of the fused features or an hourglass shape to ensure better fusion.

Additionally or alternatively, some embodiments are based on a recognition that the properties of different multi-band channels used to estimate the state of the environment can be different not only in kind but also in resolution or granularity. For example, the multiple frequency bands can include fine-grained channel measurements in the form of complex amplitudes over a set of frequency subcarriers on a span of up to 80-MHz bandwidth, super-grained channel measurements over a span of over 1-GHz bandwidth, and mid-grained channel measurements at the 60-GHz operating frequency.

Such a difference in the levels of collected details can influence the feature extraction and/or fusion process. For example, in various embodiments, the first and the second feature extraction subnetworks include the same or a different number of multiple layers for sequential extraction of the features at different resolutions. For example, if one layer extracts global features of the properties of the channel, the subsequent layer extracts more local features. However, due to the difference in resolutions, different layers of the first and the second feature extraction subnetworks can correspond to the same or different resolution and such correspondence can be beneficial for the fusion subnetwork.

To address this problem, in some embodiments the fusion subnetwork receives the outputs from different layers of the first and the second feature extraction subnetworks and combines them together for better fusion. For example, in one embodiment, the fusion subnetwork receives and combines each output of each layer of the first feature extraction subnetwork with each output of each layer of the second feature extraction subnetwork for subsequent processing over other layers of the fusion subnetwork iteratively reducing the dimensionality of the features. In such a manner, the fusion subnetwork can consider variations of resolution in a learned manner.

Feature 8: The system of Feature 5, wherein the fusion subnetwork receives and combines each output of each layer of the first feature extraction subnetwork with each output of each layer of the second feature extraction subnetwork for subsequent processing over other layers of the fusion subnetwork iteratively reducing the dimensionality of the combined outputs.

Additionally or alternatively, some embodiments are based on the realization that the difference in the granularity of different channels can be considered jointly based on actually received measurements by paying different attention to different features during the extraction and/or fusion process. Specifically, in the context of neural networks, attention is a technique that mimics cognitive attention. The effect enhances the important parts of the input data and fades out the rest—the thought being that the network should devote more computing power to that small but important part of the data. Which part of the data is more important than others depends on the context and is learned through training data by gradient descent. One example of an implementation mechanism is a network with a transformer architecture, which is represented by Feature 9 as follows.

Feature 9. The system having Feature 5, wherein the fusion subnetwork receives each output of each layer of the first feature extraction subnetwork and each output of each layer of the second feature extraction subnetwork and fuse all outputs together using an attention mechanism.

The system represented by Feature 9 can be improved by adding another feature, which can be represented by Feature 10 below.

Feature 10: The system of claim 9, wherein the attention mechanism includes a module with a transformer architecture.

Some embodiments are based on understanding that the output of the fusion subnetwork is not the ultimate objective but an intermediate step for performing the state estimation and/or a specific task. To that end, it makes sense to train the feature extraction subnetworks and the fusion subnetwork together with the state estimation and/or task execution subnetworks. However, in some situations, it can be beneficial to train the feature fusion separately without using subsequent processes. An example of this situation is when there is no labeled data for the state of the environment or execution of the task to perform the training. Another example is when there is an ambiguity regarding the tasks the fused features will be used for and, thus, it can be desired to train the fusion for various possible tasks.

Some embodiments are based on the realization that an autoencoder can determine such an efficient fusion of different features having different granularity in an unsupervised manner. The autoencoder is a type of artificial neural network used to learn efficient data codings in an unsupervised manner. The autoencoder includes an encoder and a decoder. The encoder encodes input data from the original data-space into a latent space represented by the vector of numerical values. In other words, the encoder provides a mapping between the input data in the original data-space and a latent space representation of the input data. The decoder decodes the encodings from the latent space to an estimate of the input data, i.e., reconstructs the input data. In an embodiment, the input data may be multidimensional including properties of different channels. To that end, the autoencoder determines an efficient latent space for the encoded data and the decoded data that may capture the relationship of different resolutions of the different properties in an unsupervised manner. Accordingly, the latent space of the autoencoder can determine the desired fused features. During the estimation of the state of the environment, the state estimation subnetwork is connected to receive the values of the latent space for subsequent state estimation. Advantageously, the autoencoder can be trained not only offline but online for the specific environment of interest. The autoencoder can be represented by the system having Feature 5 as Feature 11.

Feature 11: The system having Feature 5, wherein at least some of the subnetworks are trained based on an autoencoder architecture having an encoder and a decoder, wherein the first and the second feature extraction subnetworks form the encoder in the autoencoder architecture and the fusion subnetwork forms a latent space of the autoencoder architecture used for the decoding.

The system having Feature 11 can be further improved and represented by Feature 12 or Feature 13 below.

Feature 12: The system having Feature 11, wherein the decoder used to train the autoencoder architecture is disconnected during the execution of the neural network.

Feature 13: The system having Feature 11, wherein the processor is configured to execute training of the neural network and execution of the neural network, wherein during the training, the processor trains the encoder and the decoder to encode the properties of the multi-band channels into the latent space and to decode the properties of the multi-band channels from the latent space, and wherein during the execution, the processor extracts the values of the latent space and submits the extracted values to the state estimation subnetwork.

Further, the system of Feature 1 can be improved and represented by Feature 14.

Feature 14: The system having Feature 1, further comprises the service provider configured to execute the task to change the state of the environment.

Accordingly, various embodiments disclose fusing results/measurements from multi-band Wi-Fi signals for WLAN sensing. Multi-band Wi-Fi fusion enhances the capability of sensing receivers and processors for affordable overhead, improved accuracy, and robustness. In addition, some embodiments introduce learning-based fusion that takes into account granularity correspondence between different Wi-Fi channel measurements. For example, fused measurements can be with a much smaller dimension (latent space dimension) than the raw Wi-Fi channel measurements. Noticeable performance improvements are verified with experimental datasets. Multi-band Wi-Fi fusion can further relax the requirement of extensive labeled training data, particularly after the deployment of WLAN sensing devices.

In such a manner, some embodiments consider the mid-grained beam attributes (e.g., beam SNRs) as one type of Sensing measurements for WLAN Sensing. Additionally or alternatively, some embodiments consider fused multi-band Wi-Fi measurements between two or more Wi-Fi channel measurements such as CSI, beam attributes, RSSI, etc. from license-exempt frequency bands between 1 GHz and 7.125 GHz and above 45 GHz) as one type of Sensing measurements for WLAN Sensing. Additionally or alternatively, some embodiments consider fused multi-band Wi-Fi sensing results at the sensing processor as one type of sensing results for WLAN Sensing.

The system of Feature 1, wherein the jointly processed properties of the centimeter-wavelength channel and the millimeter-wavelength channel at one or more sensing receivers are sent to one or more sensing processors to determine the state of the environment.

The system of Feature 1, wherein the properties of the centimeter-wavelength channel and the properties of the millimeter-wavelength channel are shared with other sensing receivers in a coordinated or uncoordinated manner to one or more sensing processors to determine the state of the environment.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 2A and FIG. 2B are schematics illustrating coarse-grained RSSI and fine-grained CSI Wi-Fi measurements at sub-6 GHz frequency bands, FIG. 2A shows multipath propagation and FIG. 2B shows received multipath signals, according to some embodiments of the present disclosure;

FIG. 2C, FIG. 2D and FIG. 2E, are schematics illustrating coarse-grained RSSI and fine-grained CSI Wi-Fi measurements at sub-6 GHz frequency bands, FIG. 2C shows RSSI and CSI signals, FIG. 2D shows channel impulse response, and FIG. 2E shows channel transfer function or spectrum profile across subcarriers, according to some embodiments of the present disclosure;

FIG. 3A illustrates a multipath propagation, FIG. 3B illustrates received multipath signals and FIG. 3C illustrates beam Signal-to-noise (SNR) signals, according to some embodiments of the present disclosure;

FIG. 6A, FIG. 6B, FIG. 6C, FIG. 6D and FIG. 6E are schematics illustrating multi-band Wi-Fi fusion network with unsupervised training of features extraction and multi-granularity matching/fusion blocks (within an autoencoder), according to some embodiments of the present disclosure;

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The present disclosure relates to methods and systems utilizing infrastructure-free indoor and outdoor monitoring to construct a feature space for a location and environment dependent fingerprinting database, that fuse Wi-Fi measurements from multiple frequency bands. These systems and methods can be used to monitor indoor spaces without relying on dedicated sensors (e.g., camera, Lidar, radar ultrasound, infrared), and can be used for both device-carrying and device-free indoor monitoring. Further, these systems and methods can be used for applications including indoor localization of static and moving objects with or without a communication device (device-free), human pose recognition, occupancy sensing, people counting, motion recognition, etc.

Figure 1A:
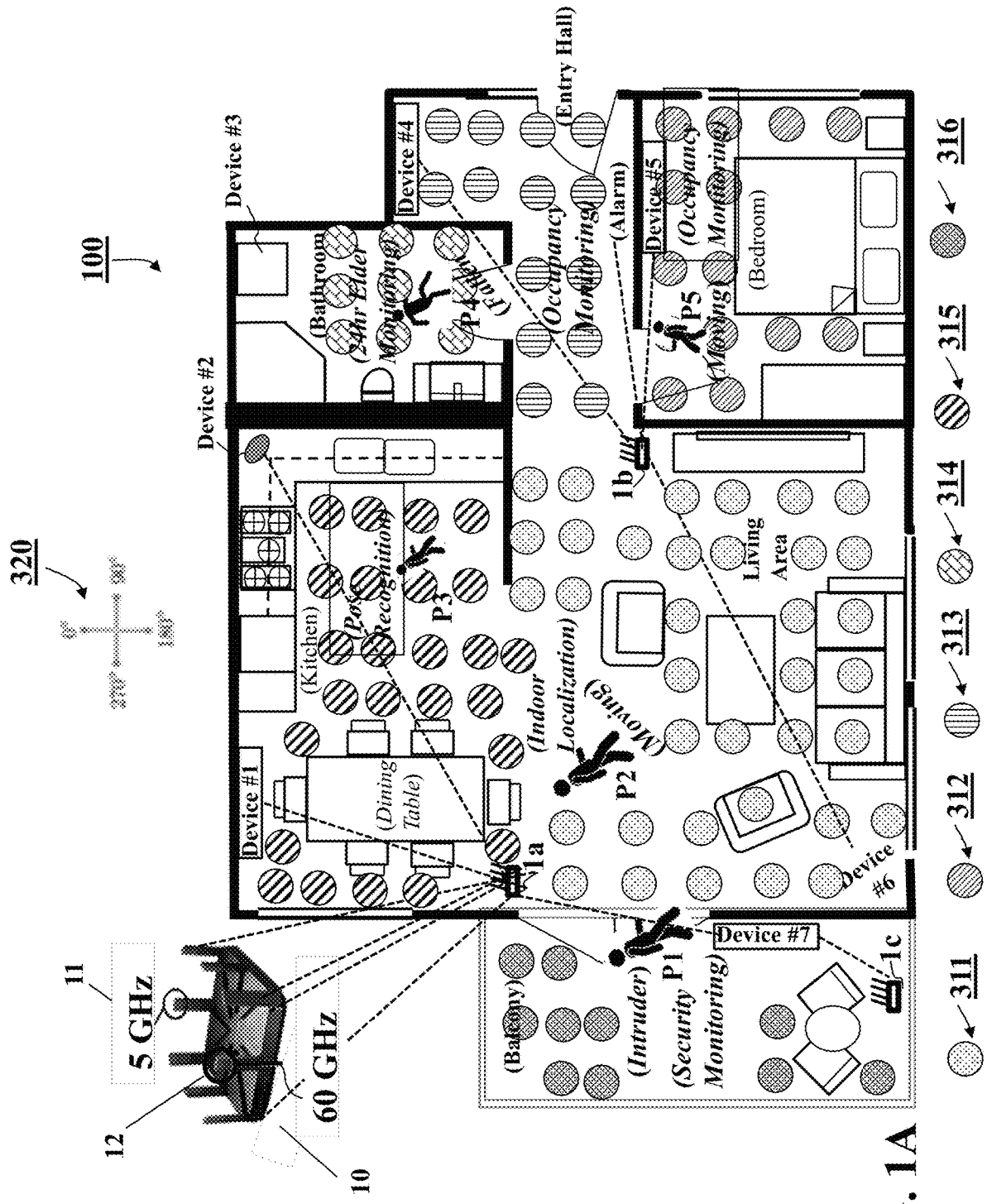
FIG. 1A is a schematic illustrating some components used for implementing a method in an indoor environment, according to an embodiment of the present disclosure.

FIG. 1A is a schematic illustrating some components used for implementing a method in an indoor environment 100, according to an embodiment of the present disclosure. For example, the method can include an architecture having radio devices 1a, 1b, 1c configured for multi-band Wi-Fi fusion between fine-grained CSI measurements at sub-7 GHz and mid-grained beam SNRs at mmWave band of 60 GHz. The indoor environment includes, by-non-limiting example, a residential setting having a kitchen, living area, bathroom, entry hall, bedroom and balcony. The radio device 1a, is located between the living area and kitchen near an exit door to the balcony. Radio device 1b is located between the living area and entry hall near an exit door from the bedroom, and radio device 1c is located outside of the indoor space on the balcony within range of radio devices 1a and 1b, located at the balcony door entering into the living area and kitchen. The location and heights of the devices can be anywhere else to sufficiently cover the indoor environment, and can be non-stationary mounted on a movable carrier, or a living human.

Each radio device 1a, 1b, 1c can include some components including radio-frequency circuits with antennas to send and receive wireless signals, computing processors to process the data communications over the Wi-Fi network, data storage to keep excitable programs and Wi-Fi data. Those radio devices are capable of communicating each other via wireless or wired links. Some of radio devices serve as an access point (AP) to provide a coverage for other radio devices to wirelessly connect in the local area network. Some APs may further connect to a wide-area network and cloud networks beyond the local area.

Still referring to FIG. 1A, smart devices and appliances are incorporated into FIG. 1A, for example, device #1 is a smart TV located in the kitchen near the dining table. Device #2 is a smart kitchen device, i.e., can be at least one refrigerator, radio, cooking appliance, fan, cleaning device, etc. Device #3 is a smart washer & dryer located in the bathroom, device #4 is a smart light device located in the entry hall, device #5 is a smart computer & TV located in the bedroom, device #6 is a smart stereo located in the living area, and device #7 is a smart heating and cooling device(s) located on the balcony. Contemplated is that any of the devices #1 to #7 can be any type of smart device, which is capable of wirelessly connecting with the APs.

The systems and methods can be used for many different types of applications including indoor & outdoor monitoring of the location, pose, state, height, motion, orientation, and behavior of static and moving objects with or without a communication device (i.e., device-carrying and device-free ambient things). As a way to highlight some of the different types of applications the embodiments of the present disclosure are configured to perform, people have been placed in FIG. 1A to represent some possible applications.

a. Types of Practical Applications Illustrated by Each Person P1-P5

"24 Hour Security Monitoring" Application: The first person P1 represents an intruder breaking into the indoor space from the balcony. Some embodiments of the present disclosure are configured to operate as a security monitoring system via devices 1a, 1b, 1c. For example, the devices 1a, 1b, 1c can be configured to monitor patterns of users living at the indoor space, and activate the alarm located in the entry hall, based on previous determined alarm activation thresholds, i.e., intruder P1 breaking in from balcony in middle of the night when users typically are sleeping.

The intruder may create a different Wi-Fi signature which is not registered in the existing dataset. Once this signature is detected, the WLAN sensing system can give an alert to the system owner.

"Indoor Localization Monitoring" Application: The second person P2 represents a person walking from the living area to the kitchen. Some embodiments of the present disclosure are configured to operate as an indoor localization monitoring system via devices 1a, 1b, 1c. For example, the devices 1a, 1b, 1c can be configured to monitor patterns of a user P2 corresponding to user activities P2 living at the indoor space, and activate a specific smart device(s) or appliances corresponding to previous predetermined device activation thresholds, i.e., user P2 always gets up from same chair in living area between a specific time period, i.e. 5:30 pm to 6:30 pm, to make a shake using a smart blender. The WLAN sensing can detect the users' movements and their locations. Active energy management systems can leverage this information to save the energy.

"Pose Recognition Monitoring" Application: The third person P3 represents a person walking in the kitchen. Some embodiments of the present disclosure are configured to operate as an indoor pose recognition monitoring system via radio devices 1a, 1b, 1c. For example, the radio devices 1a, 1b, 1c can be configured to monitor poses of P3 corresponding predetermined P3 poses living at the indoor space. The predetermined poses of P3 can be also associated with predetermined P3 activities, such that the systems and methods of the present disclosure can monitor P3's poses, and activate a specific smart device(s) or appliances corresponding to previously predetermined P3 poses thresholds. Further, it is possible that a P3 health emergency pose was detected, then confirmed via predetermined P3 health emergency pose database, and upon confirmation, the P3 health emergency pose is compared to a predetermined health emergency P3 pose event threshold. Then, a P3 health emergency predetermined protocol is activated, based upon the confirmed P3 predetermined health pose exceeding the threshold, such actions can include alerting medical personal based upon the P3 health emergency predetermined protocol. For example, P3 could have a medical condition such as epilepsy, and upon an unexpected epilepsy episode event, the systems and methods of the present disclosure can provide 24 hour monitoring and detect the episode, as well as alerting medical personal with all of P3's medical conditions, medicine's, previous conditions, allergies, etc., prior to the medical personal leaving their station.

"24 Hour Elder Care Monitoring" Application: The fourth person P4 represents a person P4 that has fallen in the bathroom. Some embodiments of the present disclosure are configured to operate as an indoor 24-hour elder care monitoring system via devices 1a, 1b, 1c. For example, the devices 1a, 1b, 1c can be configured to monitor P4 movements and corresponding predetermined P4 patterns of movements in each area in the indoor space. Wherein, each P4 movement can be consciously checked with predetermined P4 movements corresponding to P4 predetermined P4 activities. Such that the systems and methods of the present disclosure can monitor P4's movements and activate a specific smart device(s) or appliances corresponding to previously predetermined P4 movement thresholds. Moreover, the systems and methods of the present disclosure can monitor P4's movements and activate a P4 health protocol not corresponding to previously predetermined P4 movement thresholds. For example, if P4 falls in the bathroom and left unconscious for a period of time and based upon confirmation P4 predetermined movements laying still on the bathroom floor exceeds a predetermined P4 movement event threshold or time period threshold. Then, upon confirmation of exceeding the threshold, a predetermined P4 medial protocol can be initiated, wherein medical protocol actions will be initiated.

"Occupancy Monitoring" Application: The fifth person P5 represents a person P5 walking from the bedroom to the entry hall. Some embodiments of the present disclosure are configured to operate as an indoor occupancy monitoring system via devices 1a, 1b, 1c. For example, the devices 1a, 1b, 1c can be configured to monitor P5 movements and corresponding predetermined patterns of movements of all users in the indoor space, including P5. Wherein, a total occupancy for the indoor space can be continuously checked with predetermined total occupancy patterns for each time period. Such that the systems and methods of the present disclosure can monitor the total occupancy over each time period and activate a heating & cooling system(s), smart devices, i.e., fans, corresponding to previously predetermined occupancy thresholds. Moreover, the systems and methods of the present disclosure can monitor occupancy for the indoor space, and activate an occupancy protocol based upon previously predetermined occupancy thresholds according a specific time period, outdoor detected event, indoor space event, etc.

Some other practical indoor localization applications of static and moving objects with or without a communication device (device-free), that other embodiments of the present disclosure can be configured include, by non-limiting example: (A) indoor localization industry applications that require precise indoor localization, such as locating objects, in hospitals, warehouses, shopping malls, factories, robot monitoring, parking garage monitoring, shipyard monitoring, corporate campus monitoring, etc.; (B) indoor localization applications for users can include indoor parking assistance, proximity detection, indoor navigation, alerting application, home entertainment applications, living assistant living, tracking children, device & appliance operation, health alert related detection, etc.;

Fingerprinting Stage

FIG. 1A shows where devices 1a, 1b, 1c can provide mmWave communication coverage in the indoor space. We assume their locations and orientations do not change between fingerprinting and actual localization. The fingerprinting can consist of recording the measurements described in (1) for each fingerprint location 311, 312, 313, 314, 315, 316 and possible orientation at each location, where the orientation is defined with respect to some predetermined frame of reference 320.

States of the devices: can include types of behavior associated with each device (wherein a user can be associated with each device), locations and poses of each device in each environment. For example, each device can be associated with a user, such that the user is one of a robot, a human, a computer, a computer like device or an electronic device adaptable to a human. Wherein some types of behavior associated with each device can include, by-non-limiting example: (1) locations and poses of a specific user holding a device in the environment; (2) a device may be attached, embedded or somehow part of a human, i.e., maybe an implant, a component of a prosthetic, etc., such that locations and poses of the human with the device can be obtained; (3) a device could be a computer device that is static or dynamic within an environment, i.e., commercial or business environment, including manufacturing, hospital, assembly line, transportation system, product transportation, i.e. the computer device could be part of a tracking/monitoring network, etc.; (4) a device could be adaptable to a human such as part of a wrist device, or some other types of devices or clothing worn by a human.

States of environments: can include locations of physical objects and types of behavior of ambient users in each environment. The locations of physical objects in each environment, can include objects found in a particular type of environment. By-non-limiting example: (1) in an office environment, the objects may include furniture, pillars, doors, machinery, robots, etc.; and (2) in an industrial or manufacturing environment, the objects can include any component either static or dynamic within the environment. As noted above, a user may be one of a robot, a human, a computer, a computer like device or an electronic device adaptable to a human. Wherein, by-non-limiting example, the types of behavior of ambient users can include: (1) a robot, i.e. a static robot having moving components or a dynamic robot, movements within the environment; (2) a human or a group of humans movement within the environment; (3) a computer maybe associated with a dynamic device that moves within the environment; (4) an electronic device adaptable to static devices having moving components, mobile devices, humans, etc., that are located in an the environment, i.e., commercial, business or residential.

RSSI: Received Signal Strength Indicator

FIG. 2A and FIG. 2B are schematics illustrating multipath propagation of Wi-Fi signals at sub-6 GHz frequency bands. FIG. 2A shows multipath propagation and FIG. 2B shows received multipath signals, according to some embodiments of the present disclosure. FIG. 2A shows multipath propagation including direct LOS path (i=1), two reflected paths (i=2 and i=3), and one penetrating path (i=4) from the omnidirectional transmitter (Tx) to the omnidirectional receiver (Rx).

FIG. 2B shows received multipath signals with matching curve types of FIG. 2A to reflect different delays and attenuation due to the nature of each multipath propagation.

FIG. 2C, FIG. 2D and FIG. 2E are schematics illustrating coarse-grained RSSI and fine-grained CSI Wi-FI measurements at sub-6 GHz frequency bands. FIG. 2C shows RSSI signal that is calculated from the signals at FIG. 2B. It reflects the total signal power with additional antenna gains. FIG. 2D shows channel impulse response that indicates the delay profile of all propagation paths (i=1,2,3,4) with corresponding path gain, and FIG. 2E shows the channel frequency response in the form of complex amplitudes over a set of frequency subcarriers which can be understood as the frequency spectrum of the channel impulse response in FIG. 2D, according to some embodiments of the present disclosure.

In an indoor environment, the complex baseband signal voltage at an RF (Wi-Fi, Bluetooth, ZigBee) receiver at a given time is measured as $$V = \sum_{i=1}^{N} \|V_i\| e^{-j\theta_i}, \quad (1)$$

where $V_i$ and $\theta_i$ are the amplitude and phase of the i-th multipath component, and N is the total number of multipath components. Then RSSI is the received power in decibels (dB) as a. $\text{RSSI} = 10 \log_2(\|V\|^2),$ (2)

Early WiFi-based indoor localization systems used RSSI measurements to estimate indoor location in a direct localization fashion. For fingerprinting-based methods, RSSI was used directly as fingerprinting data in systems such as Radar, Compass, and Horus due to easy access to 802.11ac- and 802.11n-compliant devices.

Machine learning methods such as the k-nearest neighbor (kNN) and support vector machine (SVM) were applied to RSSI fingerprinting measurements. In a probabilistic Bayesian method can measures the similarity between the test and fingerprinted RSSI measurements. Instead of using parametric statistical distributions such as the Gaussian and lognormal distributions, non-parametric kernel methods applied to the RSSI measurements can be used to extract statistical distribution of RSSI measurements to infer the likelihood of test measurements. Leveraging machine learning frameworks such as discriminant-adaptive neural network, robust extreme learning machines, and multi-layer neural networks, RSSI fingerprinting-based indoor localization methods showed improved localization performance over machine learning approaches. A proposed approach considered to apply recurrent neural networks (RNNs) to RSSI measurements for utilizing trajectory information. In some cases, the neural network may be referred to as a deep neural network.

Nevertheless, as a superposition of multipath voltages, RSSI measurements fluctuates over time at a given location. That is, a slight change in certain multipath components contributes to constructive or destructive relative phases of the delayed signals and, consequently, leads to considerable fluctuations in the RSSI. Moreover, at a given time, RSSI is only a scalar measurement which is usually referred to as the coarse-grained channel measurement.

CSI: Channel State Information

By modeling the wireless channel as a temporal linear filter, one can measure the channel impulse response (CIR) $h(\tau)$ as $$h(\tau) = \sum_{i=1}^{N} a_i e^{-j\theta_i} \delta(\tau - \tau_i), \quad (3)$$

where $\alpha_i$, $\theta_i$, and $\tau_i$, are, respectively, the amplitude, phase, and delay of the i-th multipath, N is the total number of multipath components, and $\delta(\cdot)$ is the Dirac delta function. Each impulse represents a delayed multipath component, multiplied by the corresponding amplitude and phase. FIG. 2D shows the CIR of four propagation paths (i=1,2,3,4) in FIG. 2A.

Given the CIR h(t), the received signal r(t) is the temporal convolution of the preamble s(t) and h(t): r(t)=s(t)⊗h(t). The channel frequency response (CFR), the Fourier transform of the CIR, is often measured as $$H(f) = S^*(f) R(f), \quad (4)$$

where R(f) is the Fourier transform of r(t) and S*(f) is the complex conjugate of the Fourier transform of s(t). In commercial Wi-Fi devices, it might be more convenient to implement the process with particular modulation schemes, e.g., OFDM in IEEE 802.11a/g/n/ac. In this way, a group of sampled CFRs at a list of frequency subcarriers are measured within the Wi-Fi bandwidth $$H(f_k)=\|H(f_k)\|e^{j\,sin(\angle H(f_k))}, k=1, 2, \ldots, K \quad (5)$$

where $f_k$ is the k-th subcarrier frequency. These complex-valued CFRs at K subcarriers are then reported to upper network layers in the format of CSI. FIG. 2E shows the CFR in the form of complex amplitudes over a set of frequency subcarriers which can be understood as the frequency spectrum of the channel impulse response in FIG. 2D, according to some embodiments of the present disclosure.

Compared with the coarse-grained RSSI, the CSI provides a fine-grained channel measurement with better capability to resolve multipath in the time or frequency domain. Although also suffering from the temporal fluctuation, the CSI provides a set of complex-valued random variables (i.e., multipath components) compared with the scalar RSSI, a simple summation of the multipath components. Nevertheless, the richer information provided by the CSI needs to be carefully exploited to derive robust task-specific yet environmental-invariant features.

CSI extraction from off-the-shelf Wi-Fi devices, e.g., Intel Wi-Fi Link 5300 radio, Atheros 802.11n chipsets, and Cypress 802.11ac chipsets, have enabled access to the CSI over a bandwidth of up to 80 MHz at sub-6 GHz (i.e., 2.4 and 5 GHz bands), and prompting learning-based feature extraction and wireless sensing applications. For instance, convolutional neural networks (CNNs) have been used to train CSI measurements from three antennas, for classifying the location, and estimating location coordinates with weights equal to the classified category posteriors. Fingerprinted full CSI over multiple time instants, calibrated their phases and fitted one autoencoder for one location. An unknown location was estimated as centroid of fingerprinted locations with weights computed from autoencoders' reconstruction errors. Besides the above classification-first localization methods, CSI measurements were trained directly to provide the coordinate estimation by formulating a regression problem. Similarly, the sub-6 GHz CSI has been exploited for human sensing tasks such as device-free localization, activity recognition, fall detection, personal identification, emotion sensing, and skeleton tracking. Some aspects from camera images were used to train fine-grained CSI measurements over 30 subcarriers and 5 frames from 3 transmitting and 3 receiving antennas. The cross-modal deep learning approach showed the potential of commercial WiFi signals for sensing applications.

As bandwidth increases, the stronger capability of CSI distinguishes multipath components in the time and frequency domains. At mmWave bands (e.g., 28-GHz for 5G communication and 60 GHz for IEEE 802.11ad and 802.15.3c), the use of CSI measurements for fingerprinting was much less reported due to the cost of a dedicated mmWave platform or no access to CSI measurements from COTS mmWave WiFi devices.

(mmWave) Beam Attributes: Beam SNR

Figure 3A:
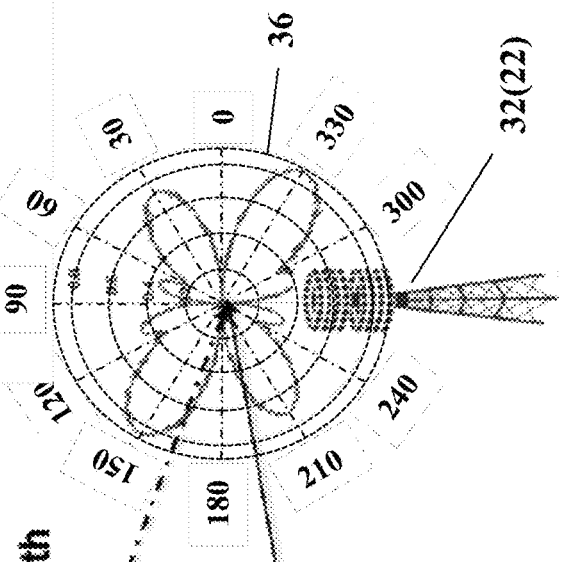
FIG. 3A, FIG. 3B and FIG. 3C are schematics illustrating mid-grained beam SNR measurements at mmWave frequency bands, i.e., 60 GHz in 802.11ad.
Figure 3A:
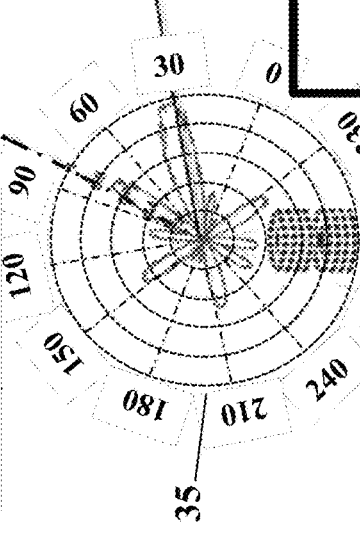
Figure 3B:
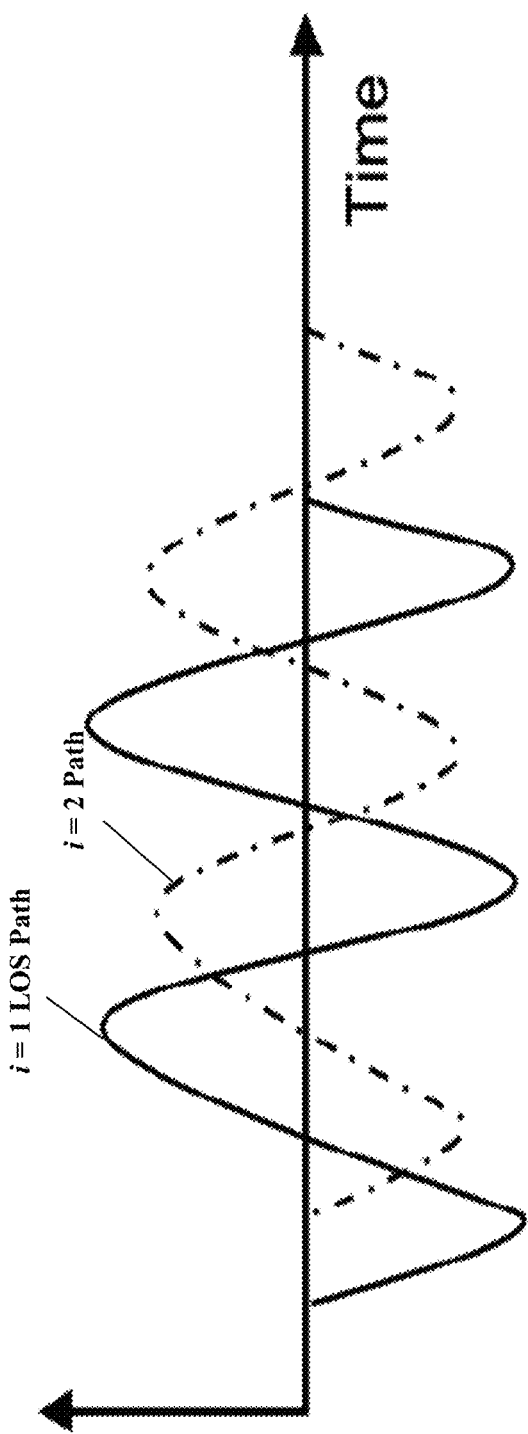
Figure 3C:
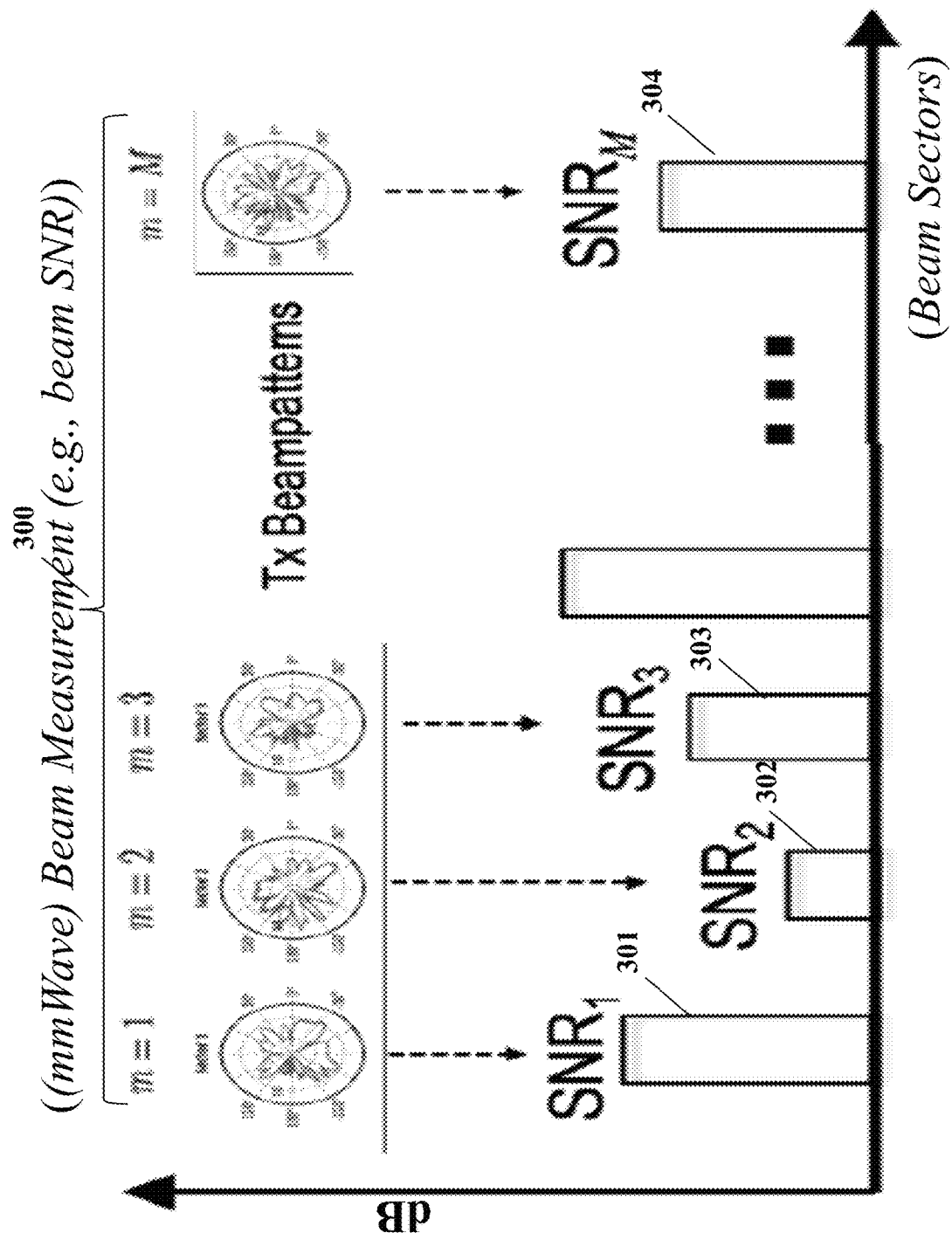

FIG. 3A, FIG. 3B and FIG. 3C are schematics illustrating mid-grained beam measurements at mmWave frequency bands, i.e. 60 GHz in 802.11ad, FIG. 3A illustrates a multipath propagation, FIG. 3B illustrates received multipath signals and FIG. 3C illustrates beam measurements in the form of beam signal-to-noise (SNR), according to some embodiments of the present disclosure.

Instead of the super-grained mmWave CSI which is not accessible from COTS devices and may introduce huge overhead, measurements generated from the beam training (also referred to as beam alignment) phase provide a distinct mid-grained Wi-Fi measurement in the beam angle domain.

During the beam training phase, directional probing beampatterns are used to determine desired directions for subsequent data communication in order to compensate large path loss at mmWave bands. For each probing beampattern (also referred to as beam sectors), beam SNR is computed and collected by 802.11ad devices as a measure of beam quality. Such beam training is then periodically repeated, and the beam sectors are updated to adapt to the environmental changes.

For a given pair of transmitting and receiving beampatterns, corresponding beam SNR can be defined as $$h_m = BeamSNR_m = \frac{1}{\sigma^2}\sum_{i=1}^{I} \gamma_m(\theta_i)\zeta_m(\psi_i)P_i, \quad (6)$$

where m is the index of beampattern, I is the total number of paths, $\theta_i$ and $\psi_i$ are the transmitting and receiving azimuth angles for the ith path, respectively, $P_i$ is the signal power at the ith path, $\gamma_m(\theta_i)$ and $\zeta_m(\psi_i)$ are the transmitting and receiving beampattern gains at the ith path for the mth beampattern, respectively, and $\sigma^2$ is the noise variance.

FIG. 3A shows an example of I=2 paths between the transmitting side that probes the spatial domain using a directional beampattern 35 and the receiving side which is in a listening mode (e.g., in a so-called quasi-omni-directional beampattern 36), while FIG. 3C shows a number of pre-determined beampatterns 300 used at the transmitting side to compute corresponding beam SNRs 301-304. These beampatterns 300 were measured for AD7200 routers in a chamber at the TU Darmstadt. Note that these measured beampatterns exhibit fairly irregular shapes due to hardware imperfections and housing at 60 GHz.

By comparing FIG. 2A with FIG. 3A, several observations can be made. First, multipath propagation is richer at sub-6 GHz bands (i.e., 4 paths) than 60 GHz bands (i.e., 2 paths). Second, the penetration path (denoted as dot lines) in FIG. 2A do not survive in the 60 GHz link due to its much shorter wavelength and less capability to penetrate obstacles (e.g., wall). Third, mmWave Wi-Fi devices are equipped with phased array that enables highly directional beampatterns while antenna elements of sub-6 GHz Wi-Fi devices are mostly in an omni-directional mode. Although multiple antenna elements at sub-6 GHz can be used for beamforming, the beampatterns are less directional than the mmWave Wi-Fi devices due to the smaller number of antennas and the relatively large inter-element spacing.

Multi-Band Wi-Fi Fusion

Figure 4A:
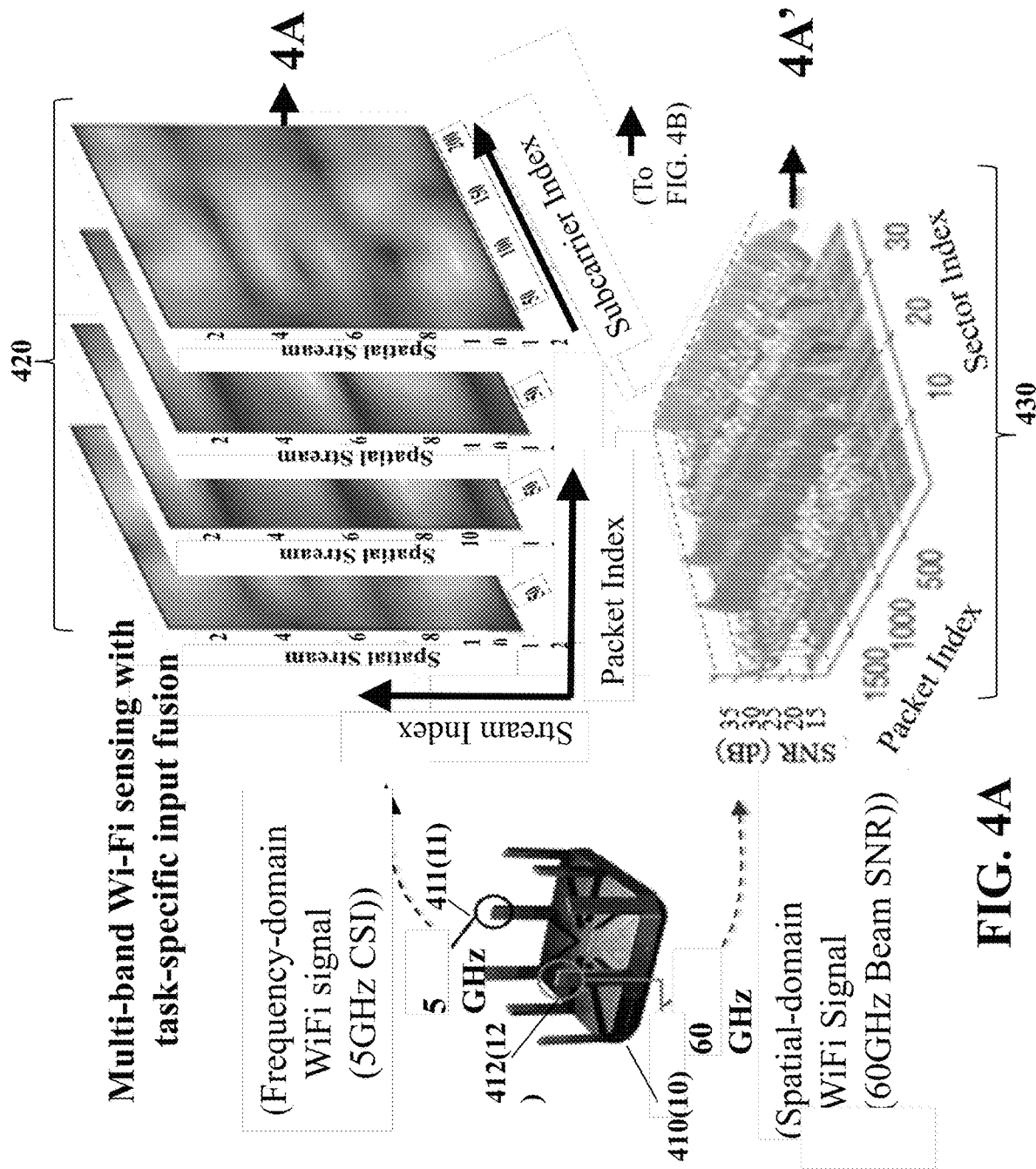
FIG. 4A, FIG. 4B and FIG. 4C are schematics illustrating multi-band Wi-Fi sensing with task-specific input fusion, according to some embodiments of the present disclosure.
Figure 4B:
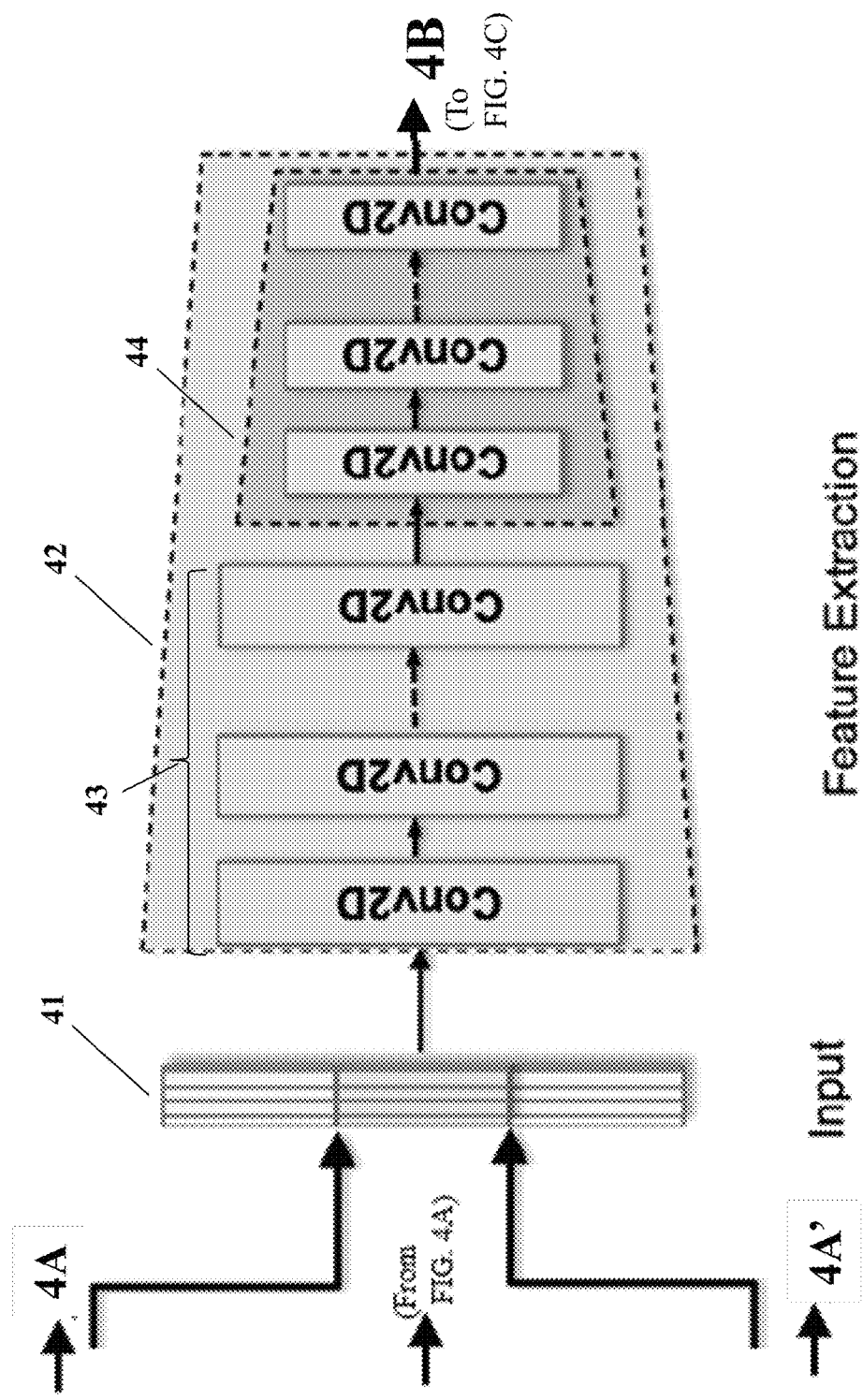
Figure 4C:
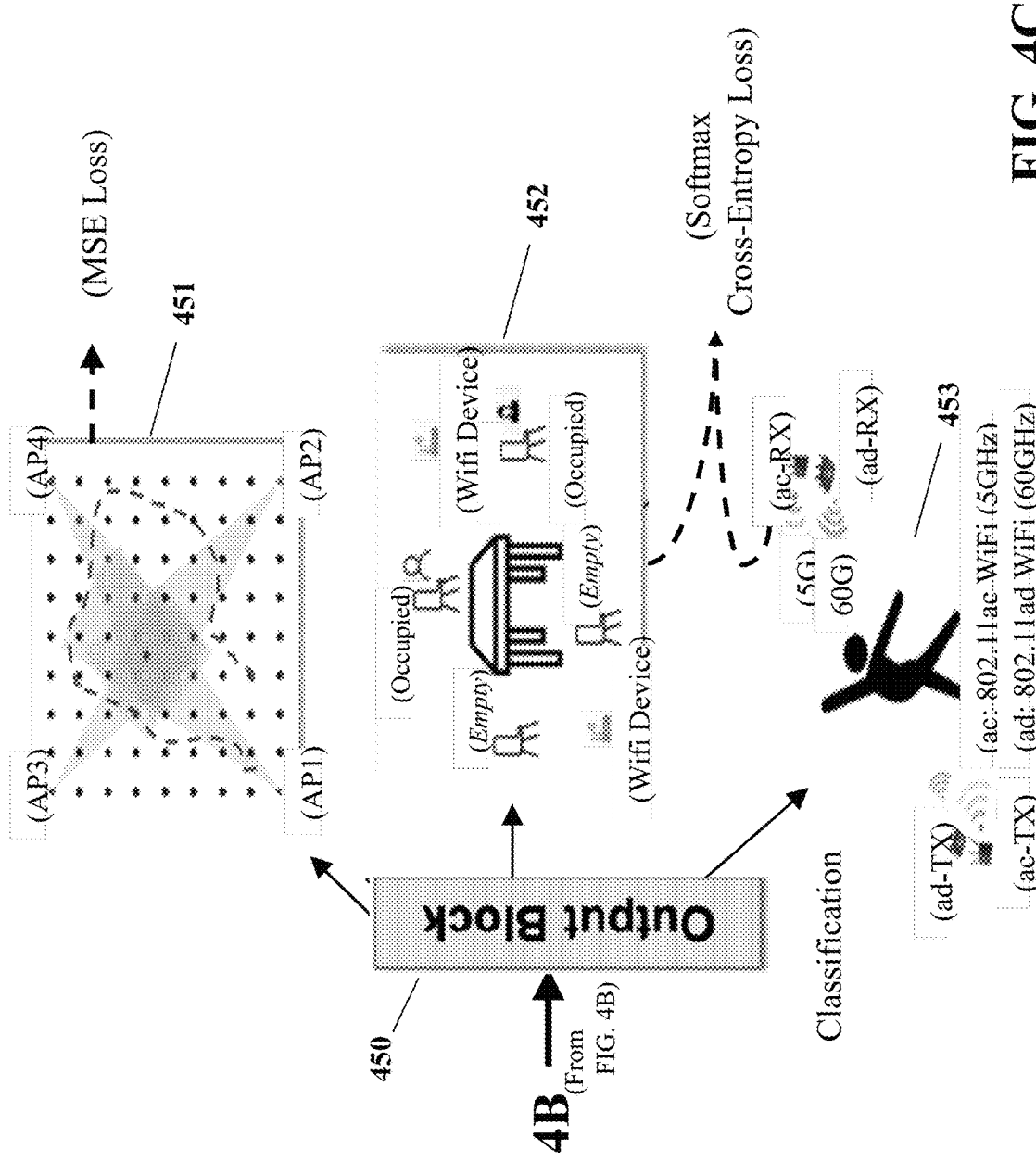

FIG. 4A, FIG. 4B and FIG. 4C are schematics illustrating multi-band Wi-Fi sensing with task-specific input fusion, according to some embodiments of the present disclosure.

Figure 5A:
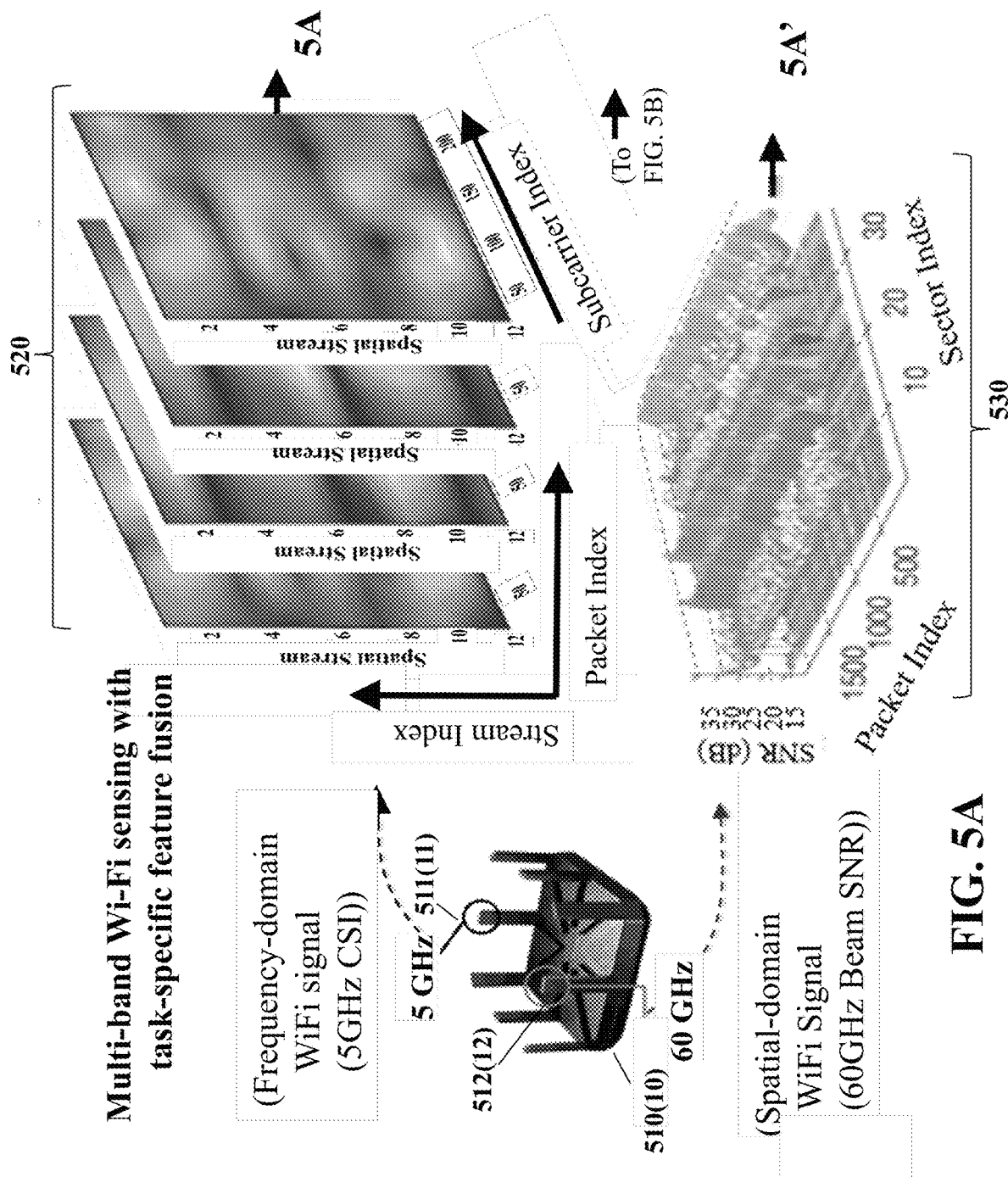
FIG. 5A, FIG. 5B, and FIG. 5C are schematics illustrating multi-band Wi-Fi sensing with task-specific feature fusion, according to some embodiments of the present disclosure.
Figure 5B:
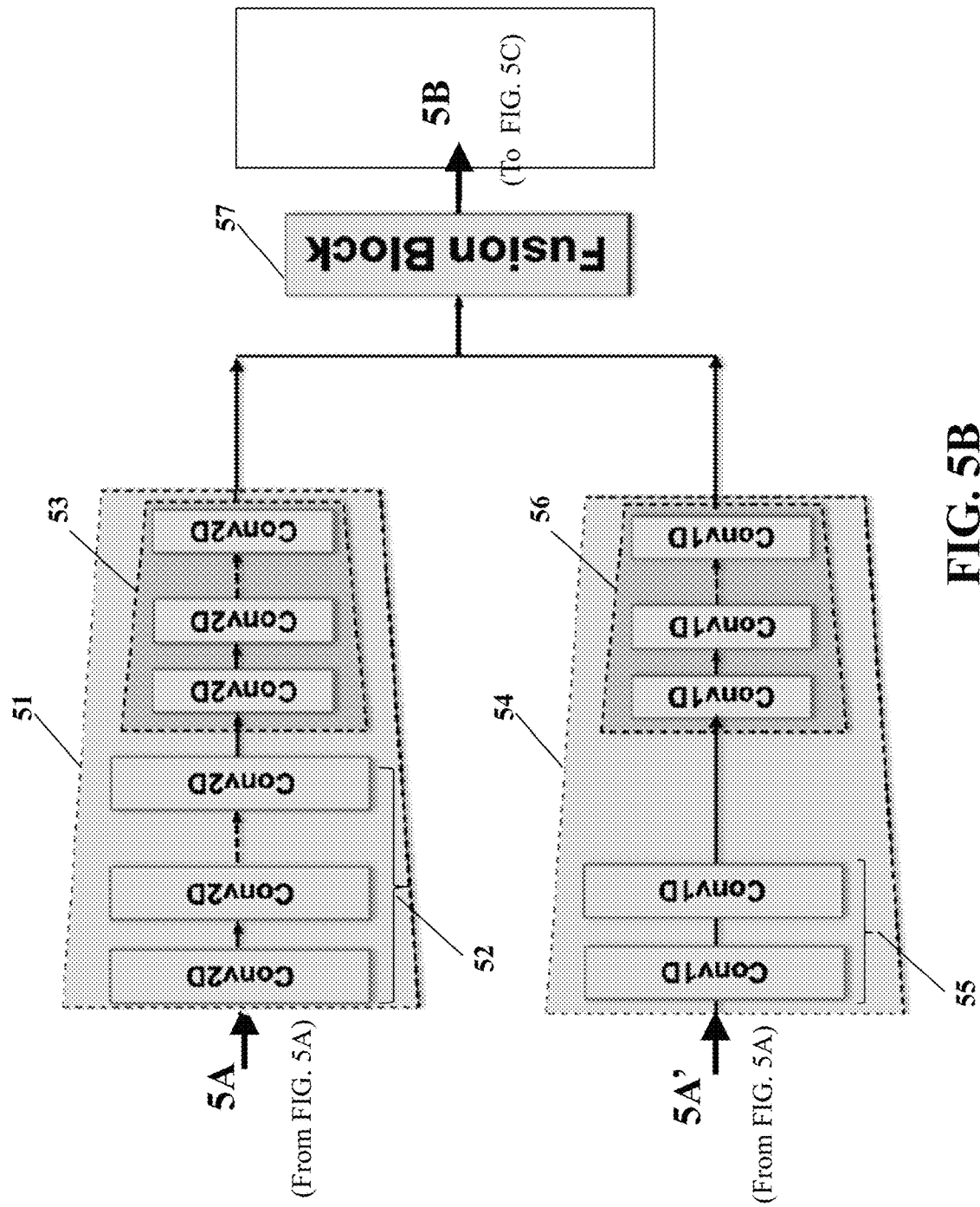
Figure 5C:
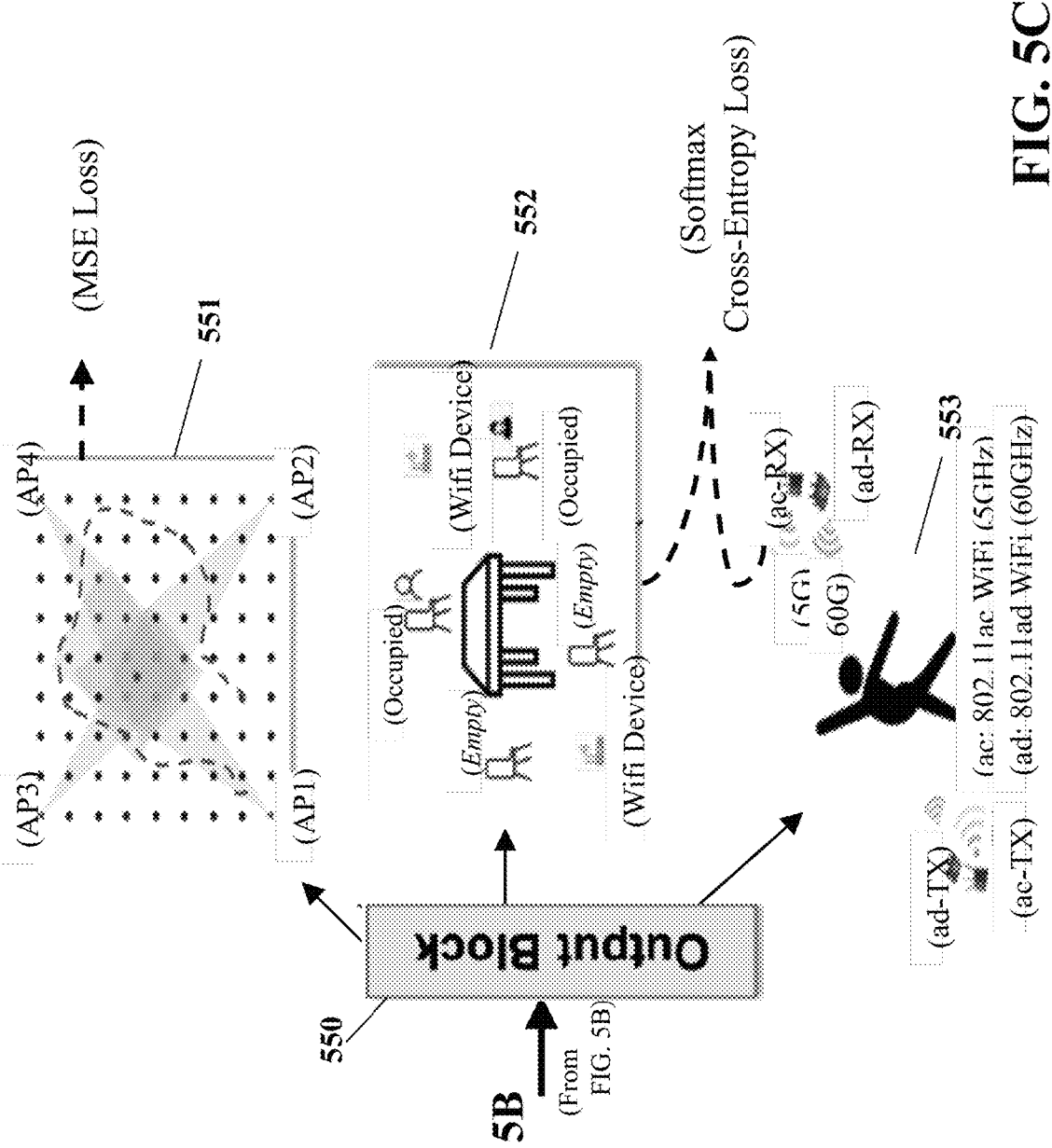

FIG. 5A, FIG. 5B and FIG. 5C are schematics illustrating multi-band Wi-Fi sensing with task-specific feature fusion, according to some embodiments of the present disclosure.

Introduced is a proposed multi-band Wi-Fi fusion between the fine-grained CSI measurements 420 at sub-6 GHz and the mid-grained beam SNRs 430 at the mmWave band of 60 GHz. The CSI measurements further consist of CFR measurements from multiple spatial streams (along the vertical axis) and over multiple packets. The stream index represents a pair of one Tx antenna and one Rx antenna. For example, with 4 Tx antennas and 3 Rx antennas, one can have 12 pairs or 12 stream indices. For each spatial stream, the CSI measurement in the format of the CFR can be obtained. In FIG. 4A, the CSI measurement at a time (or a packet) is a two-dimensional CSI image over the subcarrier and stream indices. On the other hand, the beam SNRs 430 is a one-dimensional vector at a time or a packet.

As explained above section these two Wi-Fi channel measurements provide much richer features compared with the scalar coarse-grained RSSI, and these features are complementary to each other: 1) frequency subcarriers versus spatial beam sectors, and 2) high environmental sensitivity over longer distance versus relatively medium environmental sensitivity over short distance.

Introduced is an offline fingerprinting step, preprocessing steps including normalization, denoising, and data augmentation, then task-specific multi-band Wi-Fi fusion approaches, and finally the unsupervised Wi-Fi fusion with granularity permutation.

Offline Training Dataset: Labelled and Unlabeled

Like fingerprinting-based Wi-Fi sensing methods, followed is the procedure by collecting both CSI and beam SNR measurements corresponding to each class (e.g., pose, occupancy pattern, and location/orientation) as the fingerprinting data. Specifically, uses is $C \in \mathbb{C}^{N_s \times M_s}$ and $h \in \mathbb{R}^{M \times 1}$ to denote the CSI measurements from $N_s$ spatial streams over $M_s$ subcarrier frequencies in 420 of FIG. 4A and the beam SNRs from M beampatterns in 430 OF FIG. 4A. For a given class l, R fingerprinting snapshots, $C_1(l), \ldots, C_R(l)$ and $h_1(l), \ldots, h_R(l)$, are collected to construct the offline training dataset. By collecting many realizations of both Wi-Fi channel measurements at L classes, we will have L sets of training data in the training dataset.

Albeit simple, the offline fingerprinting phase is time- and manpower-consuming. To label the data, one has to associate both channel measurements with the ground-truth labels, in the form of pose gesture, occupancy pattern, or user location. This issue is severe when one needs to build up the training dataset when the number of classes is large. Even worse, when the Wi-Fi sensing system is deployed, the ground-truth information is hard to access, although the Wi-Fi devices can still gather or listen the environment and access to both Wi-Fi channel measurements. To this end, we divide the training data into two sub-cases: 1) labelled and 2) unlabeled. In the case of labelled data, the label class 1 is automatically attached to both $C_r(l)$ and $h_r(l)$. On the other hand, we denoted $C_r$ and $h_r$ with r>R as the unlabeled training data.

Task-Specific Input Fusion

When new measurements from an unknown location are available, the problem of interest is to identify the class label. We first introduce two straightforward extension of deep learning-based fingerprinting Wi-Fi sensing by concatenating the two kinds of measurements at the input or at the later feature level.

For the task-specific input fusion, we first upsample the beam SNR of M into a length of $M_s$ subcarriers 420 and then attach the upsampled beam SNR 430 into the spatial stream dimension of the CSI:

$$\bar{C}_r(l) = [C_r(l); \tilde{h}_r(l)] \in \mathbb{R}^{(N_s+1) \times M_s} \quad (7)$$

where $\tilde{h}_r(l)$ is the upsampled beam SNR. The expanded measurements 41 are then fed into a convolution layer module 42 that includes a series of convolution layers 43 and 44 for feature extraction and classification. The output block 450 in FIG. 4C is simply a number of fully-connected layers and activation layers.

As shown in FIG. 4A, FIG. 4B and FIG. 4C, the feature extraction is implemented using several convolution layers 43 and 44 of the convolution layer module 42 with $\bar{C}_r(l) = y_0 \in \mathbb{R}^{1 \times (N_s+1) \times M_s}$ as the input. Specifically, $$y_\ell = f_\ell(y_{\ell-1}, \theta_\ell), \quad \ell = 1, 2, \ldots, N_y, \quad (8)$$

where $f_\ell$ denotes the convolution operation (including batch normalization, pooling and activation functions) with kernel parameters $\theta_\ell$ of dimension determined by the kernel size and the number of channels (feature maps). Overall, we use $N_d$ such convolution layers to gradually shrink the dimension of the feature maps while increasing the number of feature maps. The $\ell$-th feature map is denoted as $y_{N_y} \in \mathbb{R}^{N_{N_y} \times H_{N_y} \times W_{N_y}}$, where $\{N_\ell, H_\ell, W_\ell\}$ are, respectively, the number of channels, height and width of the $\ell$-th feature map.

The last feature map $y_{N_y}$ is flattened into a vector and then fed into the output block. The output block consists of a number of fully connected layers to generate an output vector u:

$$z_\ell = g_\ell(z_{\ell-1}, \gamma_\ell), \quad \ell = 1, 2, \ldots, N_g, \quad (9)$$

where $z_0$=flatten $\{y_{N_y}\}$, $u=z_{N_g}$, and $g_\ell = \sigma_\ell(W_\ell z_\ell + b_\ell)$ with $\gamma_\ell = \{W_\ell, b_\ell\}$ and $\sigma_\ell$ denoting the activation function such as rectified linear unit (ReLU) for $\ell < N_g$ and an identity mapping when $\ell = N_g$ at the final output layer. Since the input fusion network needs to be trained from the scratch for individual sensing task, i.e., indoor localization, pose recognition, and occupancy sensing, with labelled training data, we refer to FIG. 4A to FIG. 4C as the task-specific input fusion.

Task-Specific Feature Fusion

Following the input fusion, it is straightforward to fuse the two-channel measure-ments at later stages, e.g., feature maps. As shown in FIG. 5A to FIG. 5C, one can fed the two channel measurements 520 and 530 into separate feature extraction networks 51 and 54. Specifically, $$y_\ell^c = f_\ell^c(y_{\ell-1}^c, \theta_\ell^c), \quad \ell = 1, 2, \ldots, N_c$$

$$y_\ell^h = f_\ell^h(y_{\ell-1}^h, \theta_\ell^h), \quad \ell = 1, 2, \ldots, N_h, \quad (10)$$

where $y_0^c = C_r(l)$, $y_0^h = h_r(l)$, and $f_\ell^{c/h}$, and $f_\ell^{c/h}$ denotes the convolution operation for CSI-only and beam SNR-only feature extraction with corresponding parameters $\theta_\ell^{c/h}$ at the $\ell$-th layer. Note that the number of layers for CSI can be different from that for beam SNRs, i.e., $N_c \neq N_h$.

The feature fusion is then implemented with a fusion block 57 by fusing the last feature maps from the two networks. Specifically, $y_{N_c}^c$ and $y_{N_h}^h$ are flattened and then concatenated as $$y_{cat} = [\text{flatten}\{y_{N_c}^c\}; \text{flatten}\{y_{N_h}^h\}] \quad (11)$$

The concatenated feature map is then fused using a fully connected layer, $$f = W_f y_{cat} + b_f \quad (12)$$

where $W_f$ are the fusion weights with $b_f$ denoting the bias term for each fused element.

The fused feature map f is then fed into the output block 550, i.e., (9), to generate the output vector u with the input $z_0$=f. Similar to the task-specific input fusion, the feature fusion network of FIG. 5A to FIG. 5C needs to be trained from the scratch for individual sensing task, i.e., indoor localization, pose recognition, and occupancy sensing, with corresponding labelled training data including ground truth data. Therefore, we refer to FIG. 5A to FIG. 5C as the task-specific feature fusion.

Unsupervised Multi-Band Fusion with Granularity Permutation

FIG. 6A, FIG. 6B, FIG. 6C, FIGS. 6D and 6E are schematics illustrating multi-band Wi-Fi fusion network with unsupervised training of features extraction and multi-granularity matching/fusion blocks (within an autoencoder), according to some embodiments of the present disclosure.

Figure 7A:
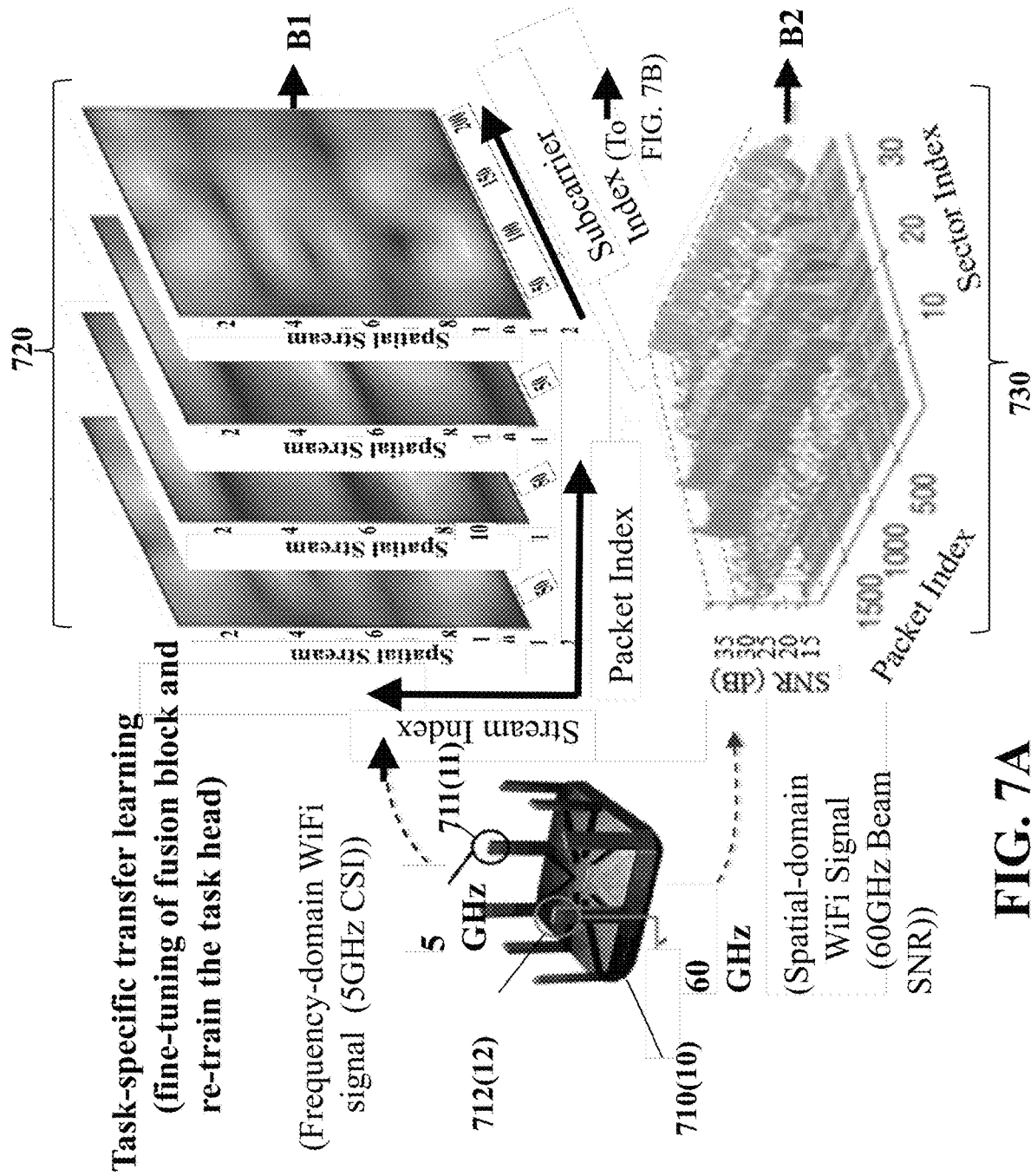
FIG. 7A, FIG. 7B and FIG. 7C are schematics illustrating multi-band Wi-Fi fusion network with task-specific transfer learning (fine-tuning of fusion block and re-train the task head), according to some embodiments of the present disclosure.
Figure 7B:
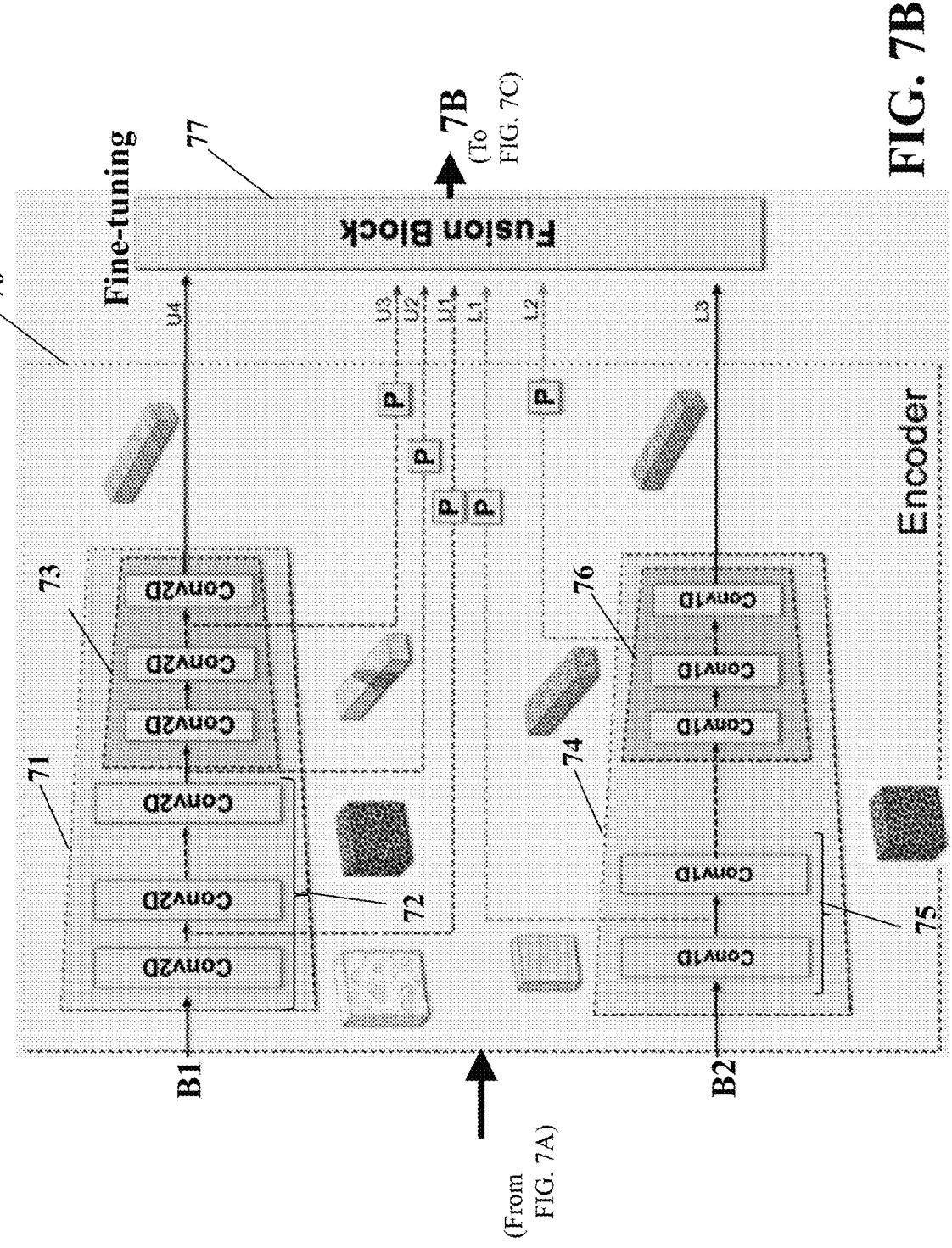
Figure 7C:
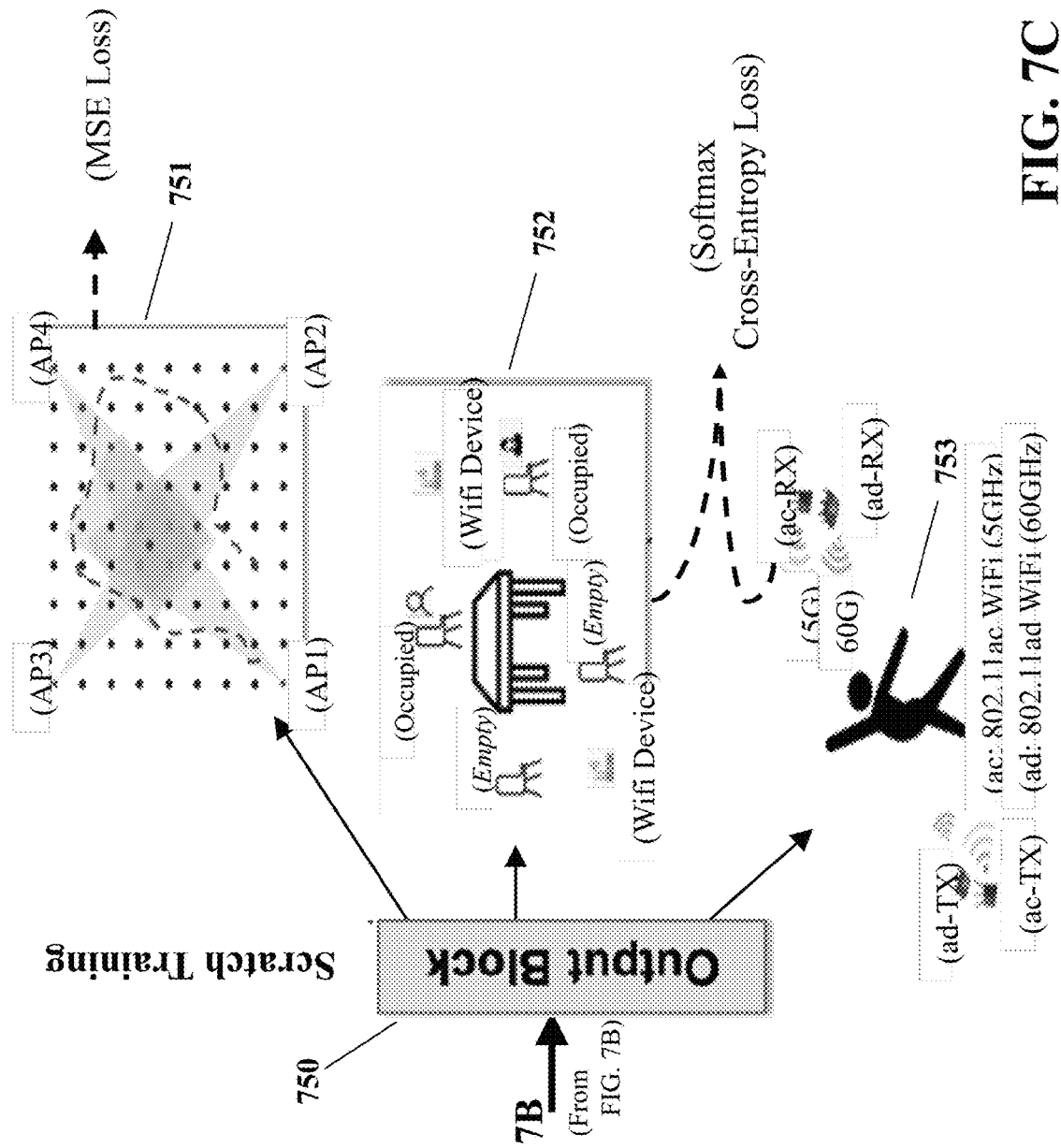

FIG. 7A, FIG. 7B and FIG. 7C are schematics illustrating multi-band Wi-Fi fusion network with task-specific transfer learning (fine-tuning of fusion block and re-train the task head), according to some embodiments of the present disclosure.

There are several issues related to the above input fusion and feature fusion methods. As stated previously, collecting large-scale labelled training data is time- and manpower-consuming. Crowdsourcing may ease the required resources but accessing the ground-truth labels (e.g., user locations and orientation) may still be limited due to privacy concerns. On the other hand, unlabeled training data are relatively easy to obtain as the Wi-Fi devices can always "listen" to activities and collect both CSI and beam SNR measurements. To better make use of the unlabeled dataset, this motivates us to consider an unsupervised learning approach, as opposed to the traditional supervised fusion, to train the fusion network between the CSI and beam SNRs.

Furthermore, CSI and beam SNRs are two distinct channel measurements with different feature granularities. When we use the convolution neural net-works to extract feature maps, there is no guarantee that feature maps at the same layer exhibit the same or similar feature granularity. Instead, it is likely that the CSI feature maps at later convolution layers may match better with beam SNR feature maps at earlier layers as the CSI is known to have finer granularity on the Wi-Fi channel and ambient environment. For this reason, we propose to permute CSI and beam SNR feature maps from different layers to achieve better multi-band Wi-Fi fusion with matched granularity.

By summarizing the above two motivations, we first introduce an autoencoder-like fusion network in an unsupervised learning fashion with granularity permutation, as shown in FIGS. 6A to 6E.

Encoder: At the encoder side, we use two separate convolution networks to encode the feature maps for CSI-only and beam SNR-only measurements.

Figure 6A:
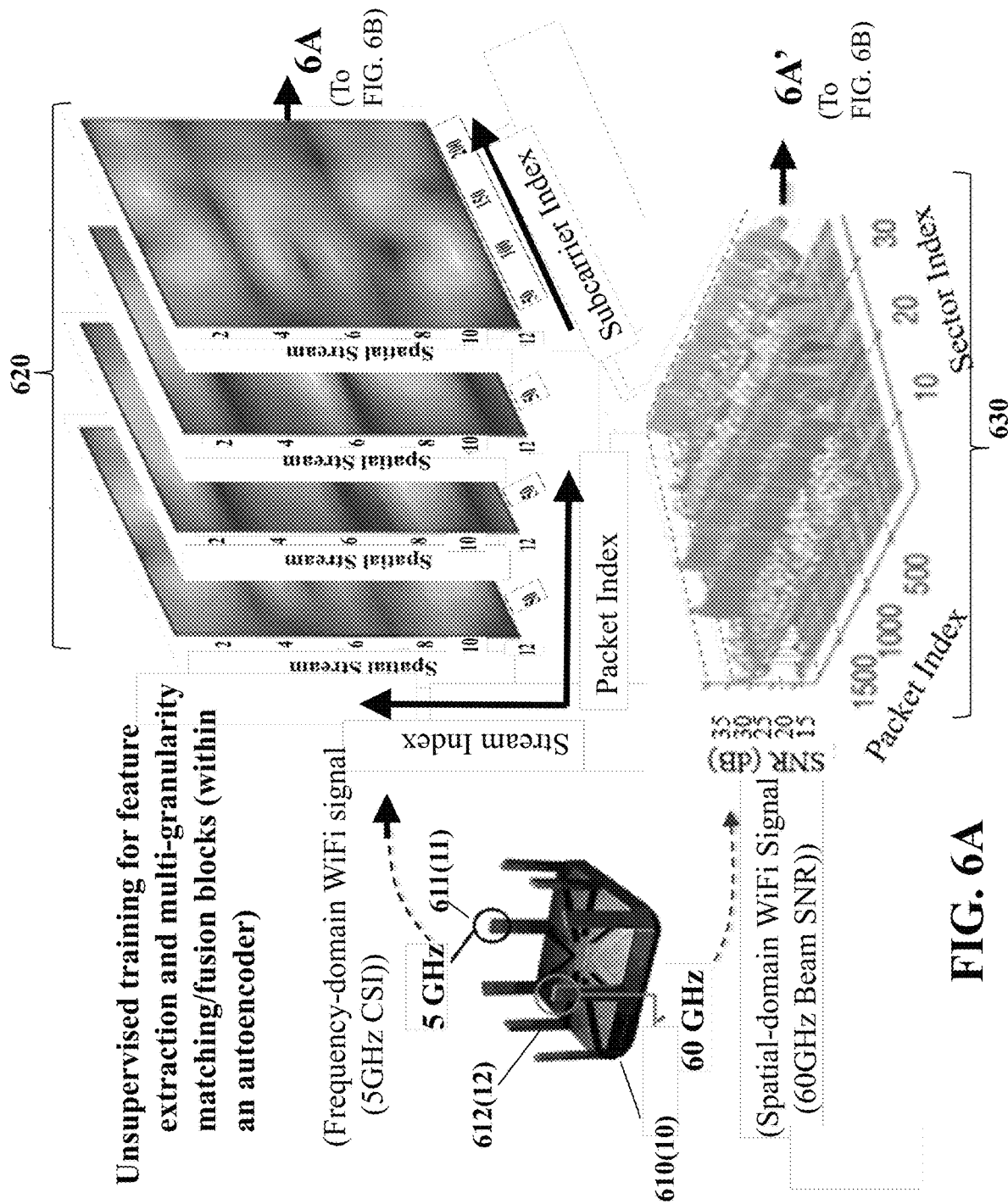
Figure 6B:
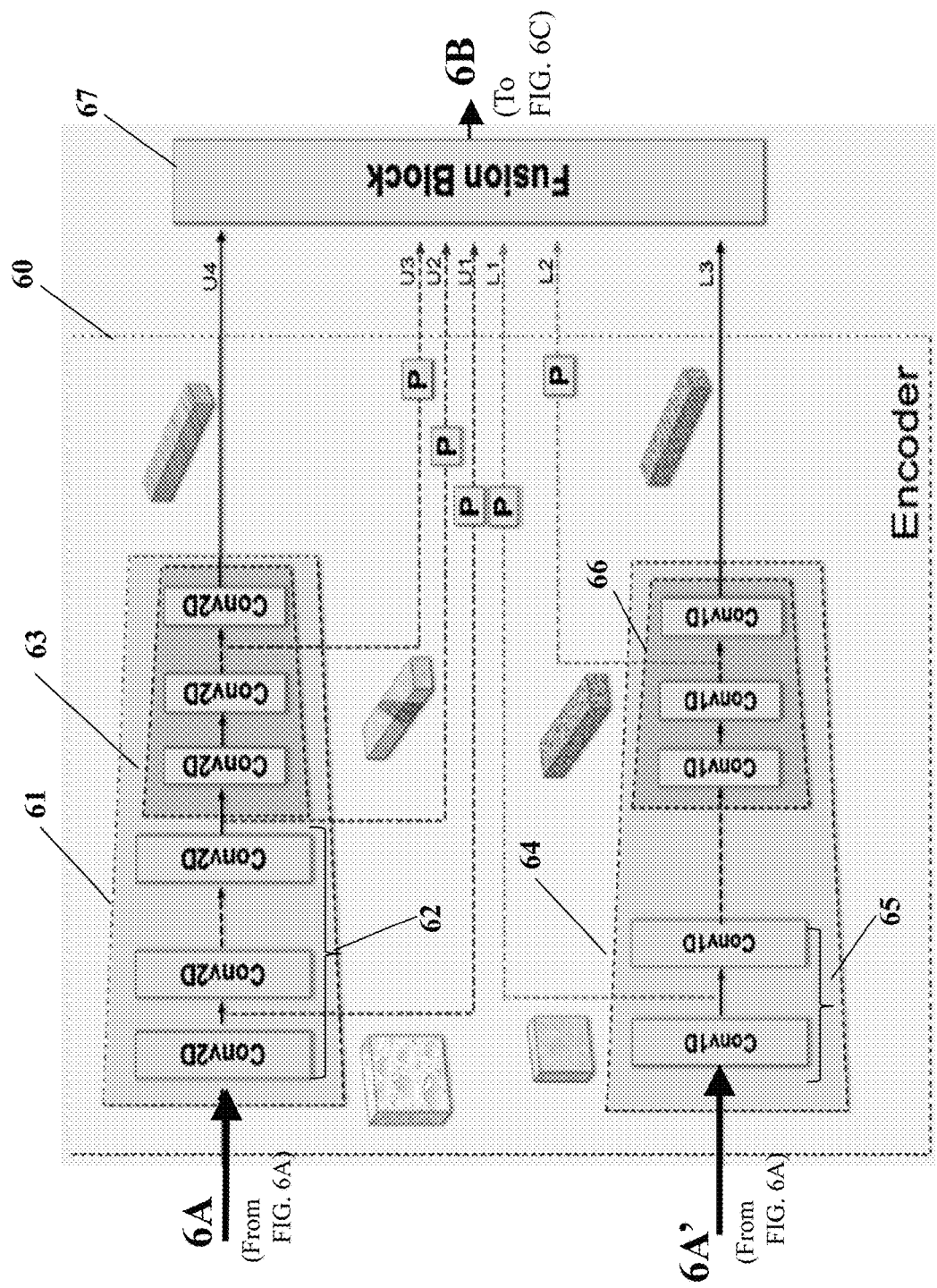
Figure 6C:
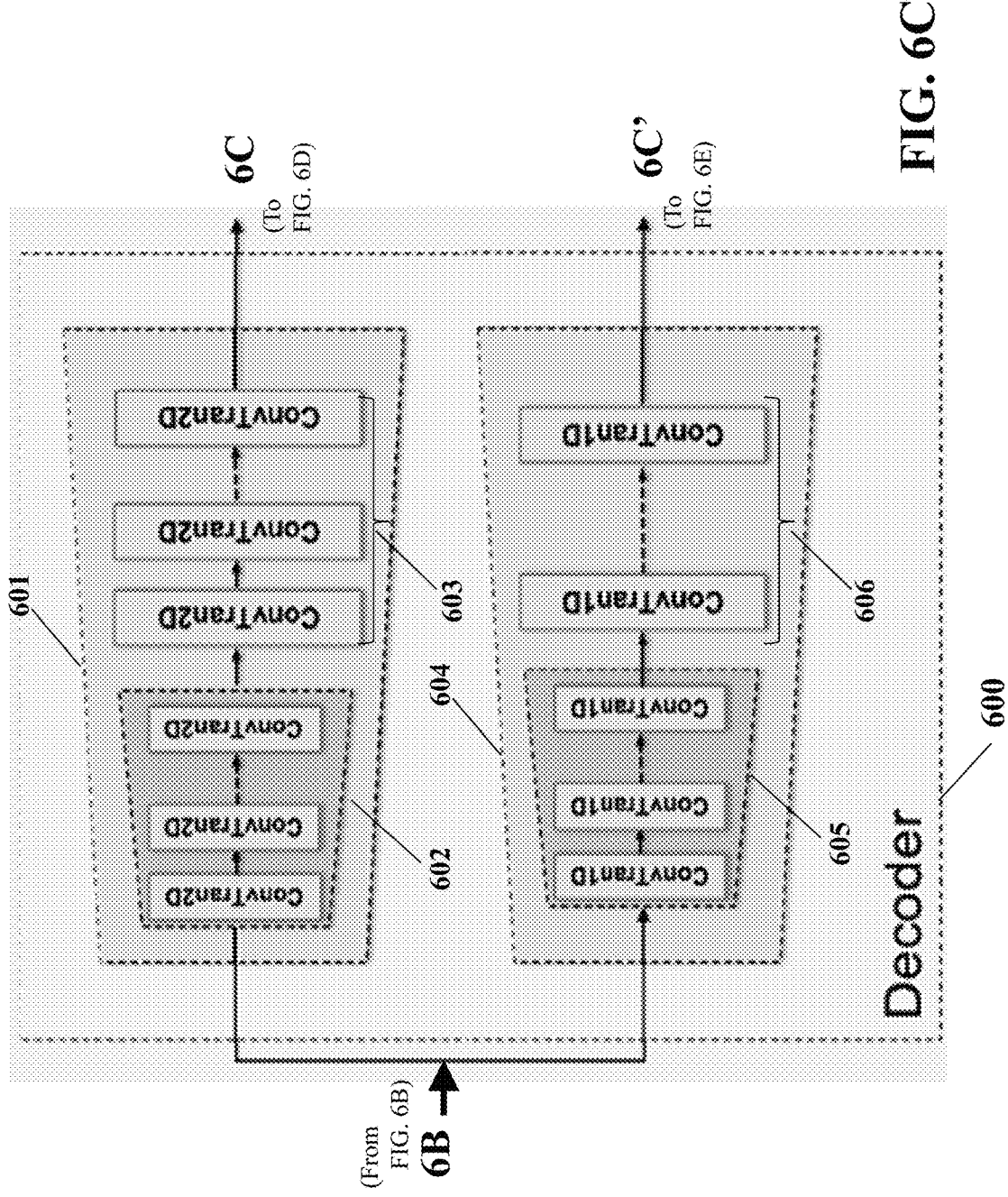

This is achieved by the same two convolution networks in (14). In addition, we extract feature map threads at multiple levels of both encoder branches as $y = \{y^c_{\ell \in \mathbb{L}_c}, y^e_{\ell \in \mathbb{L}_c}\}$ where $\mathbb{L}_c$ and $\mathbb{L}_h$ denote, respectively, the layer indices selected for granularity permutation fusion. FIG. 6B illustrates four feature maps from the CSI branch (upper branch) and three feature maps from the beam SNR branch (lower branch).

Figure 8:
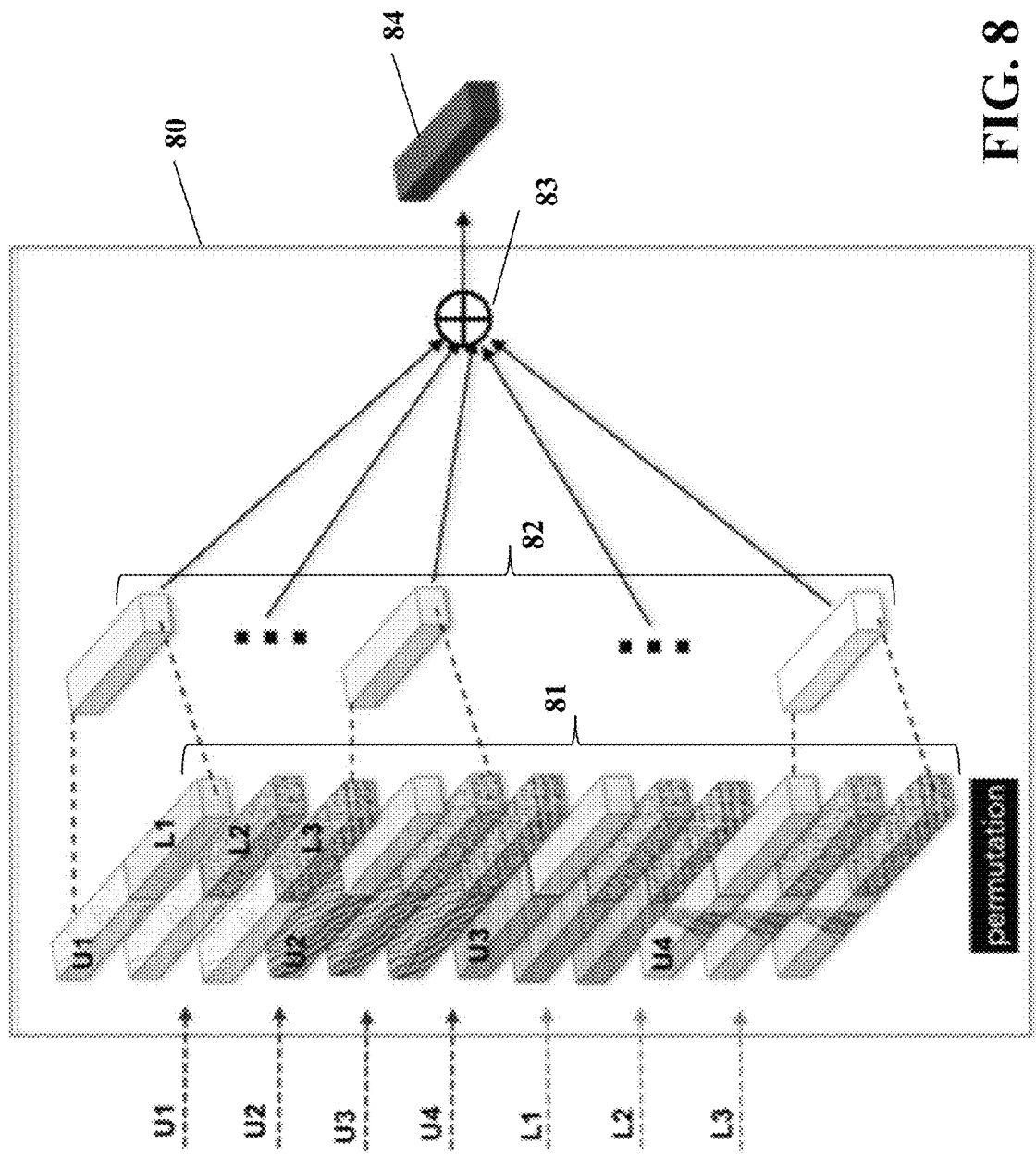
FIG. 8 is a schematic illustrating unsupervised feature fusion with granularity permutation, according to some embodiments of the present disclosure.

Fusion with Granularity Permutation: For the fusion block, the first stage is to permute the collected feature maps at selected layers from both encoders. As illustrated in FIG. 8, we permute the pairs of two feature maps: one is from the CSI encoder and the other from the beam SNR encoder and concatenate them into a long vector $$y_p = [\text{flatten}\{y^c_\ell\}; \text{flatten}\{y^h_{\ell'}\}], \ell \in \mathbb{L}_c, \ell' \in \mathbb{L}_h \quad (13)$$

where p=1, . . . , P is the permutation index attached to the layer index pair of $\{\ell, \ell'\}$. For instance, in FIG. 6B, we have 4-layer indices in $\mathbb{L}_c = \{1, 3, 5, 6\}$ and 3 elements in $\mathbb{L}_h = \{1, 4, 5\}$ which leads to P=12 permutation pairs in FIG. 8. Each pair of the permuted feature maps is fused with a fully connected layer into the same dimension, $$f_p = W_p y_p + b_p, p=1, \ldots, P, \quad (14)$$

where $W_p$ is the fusion weights for the p-th permutation pair with $b_p$ denoting the bias term. The final fusion layer is a linear combination of the fused permutation feature map as $$f = \sum_{p=1}^{P} a_p f_p \quad (15)$$

where $a_p$ is the second-stage linear fusion weight.

Decoder: At the decoder side, the fused feature f is fed to two separate decoders to recover the CSI-only and beam SNR-only measurements simultaneously. Particularly, $$f = t_0^c = t_0^h,$$
$$t_\ell^c = d_\ell^c(t_{\ell-1}^c, \zeta_\ell^c), \ell = 1, 2, \ldots, N_c$$
$$t_\ell^h = d_\ell^h(t_{\ell-1}^h, \zeta_\ell^h), \ell = 1, 2, \ldots, N_h \quad (16)$$

where f is the output of the fusion block in FIG. 6B that is simultaneously fed into the two decoders, $d_\ell^{c/h}$ denotes the transposed convolution or upsampling operation at the $\ell$-th layer of the two decoders with corresponding parameters $\zeta_\ell^{c/h}$. Usually, we implement the decode network with a mirrored architecture of its encoder network. Therefore, we keep the same number of layers, $N_c$ and $N_h$, in the decoders.

To train the autoencoder-based fusion network, we adopt a weighted mean-squared error (MSE) as the cost function:

$$L_{MSE}(w_c) = w_c \sum_r (y_0^c - t_{N_c}^c)^2 + (1 - w_c) \sum_r (y_0^h - t_{N_h}^h)^2 \quad (17)$$

where $y_0^c = C_r$ and $y_0^h = h_r$ are the CSI and beam SNR training samples, while $t_{N_{c/h}}^{c/h}$ are corresponding outputs of the two decoders 61 and 64.

FIG. 8 is a schematic illustrating feature fusion with granularity permutation, according to some embodiments of the present disclosure.

Transfer Learning for Multi-Task Wi-Fi Sensing

With the pretrained fusion autoencoder that accounts for granularity permutation in FIG. 6A to FIG. 6E, we propose to use the transfer learning to freeze the encoder parameters, remove the decoder block 600, and attach an output classification block 750, as shown in FIG. 7A to FIG. 7C.

With the labelled training data for each sensing task, we retrain the output classification block 750 which takes the same form of (9) with a number of fully connected layers and outputs the vector u. Meanwhile, we fine-tune the parameters within the fusion block with a small training step size on the linear fusion weights $\{a_p\}_{p=1}^{P}$ of (15) and an even smaller step size on $\{W_p, b_p\}$ of (14). By formulating each sensing task as a classification problem. For a training input $\{C_r(l), h_r(l)\}$ with a label l, the corresponding output of the last layer u is first normalized with the SoftMax operation as $$s_n = \exp(u_n) / \sum_{i=1}^{N} \exp(u_i), n \in \{1, 2, \ldots, N\}. \quad (18)$$

where $s_n$ is the nth element of the normalized output $u_n$. Then, the cross-entropy loss function is computed over the score vector and the $s=[s_1, s_2, \ldots, s_N]$ and the corresponding one-hot label vector $c=[c_1, c_2, \ldots, c_N]$ as $$L_{classification} = -\sum_n c_n \log(s_n). \qquad (19)$$

where the one-hot label vector c is 1 at the l-th element and 0 elsewhere. The average probability of successful classification (or accuracy) is calculated by the ratio between the number of correct estimations and total samples, i.e., Pr(arg max$_i$ s$_i$=arg max$_i$ c$_i$) where Pr(•) denotes the sample probability that the argument event is true. Note that, for different sensing applications, the dimension of the output vector u may be different, depending on the number of classes. For instance, N=8 for the pose recognition and occupancy sensing and N=16 for the indoor localization.

Experimentation

Test experiments where motivated by looking to discover ways to overcome some of the conventional known challenges for conventional Wi-Fi sensing frameworks. Most conventional frameworks use fine-grained channel state information (CSI) from the physical layer or coarse-grained RSSI measurements from a MAC layer. Observed from experimentation is that RSSI measurements suffers from the measurement instability and coarse granularity of the channel information, which lead limited accuracy for localization. Also observed is that CSI measurements are more fine-grained but require access to physical-layer interfaces and high computational power to process a large amount of sub-carrier data. One test experiment included using a mid-grained beam measurements which provided more informative (e.g., in the spatial domain) than the RSSI measurement and it was observed to be easier to access than the lower-level CSI measurement. Specifically, the spatial beam SNRs that were inherently available (with zero overhead) for beam training for a fifth-generation (5G) and IEEE 802.11ad/ay standards operating at millimeter-wave (mmWave) bands, were used to construct the fingerprinting/training dataset. The use of the mid-grained channel measurement appeared to provide easy access to beam SNR measurements from COTS 802.11ad WiFi routers.

Some test fusion-based approaches included using heterogeneous sensor modalities such as on-device or wearable sensors, e.g., inertial navigation system (INS), magnetic sensors, accelerometer, ultrasound on user equipment's (UE), and other surrounding sensors such as camera, Bluetooth, and ZigBee. These heterogeneous sensor signals were then fused with Wi-Fi signals (either RSSI or CSI) in a traditional maximum likelihood framework or more advanced deep learning context. For instance, continuous localization of indoor pedestrian was achieved using an Inertial Navigation System (INS) with tracking errors adjusted by the Wi-Fi.

Other test experiments include deepfusion which combined heterogeneous wearable (e.g., smartphone and smart watch) and wireless (Wi-Fi and acoustic) sensors for human activity recognition. Another test experiment observed that when only wireless radio frequency (RF) sensors (e.g., Wi-Fi, Bluetooth, ZigBee, LTE) were considered, the fusion of the coarse-grained RSSI, Bluetooth, and ZigBee measurements were considered with a k nearest neighbor (kNN) method. Another test approach observed that fine-grained CSI can be used first to extract an Angle-of-Arrival (AoA) measurements, and then, fused with RSSI from Bluetooth in a context of traditional maximum-likelihood estimation (MLE) framework.

Several test approaches included further narrowing the scope to Wi-Fi-only measurements, wherein one test approach fused measurements between CSI and RSSI by concatenating a scalar RSSI to a high-dimension CSI. For the CSI Wi-Fi measurements, another test approach tested the fusion of the phase and amplitude of the fine-grained CSI, as opposed to the magnitude-only CSI, for the localization purposes. What was observed is that when multiple APs or radio devices are available, yet another test approach fused multi-view CSI measurements over APs/radio devices using a generalized inter-view and intra-view discriminant correlation analysis. A last test approach attempted to fuse probability maps from multiple APs and multiple transmit antennas.

Other Features

An aspect includes the wireless channel attribute data is based on one or a combination of, an amount of a signal strength, an amount of a noise strength, an amount of an interference strength, an amount of a signal-to-noise ratio, an amount of a signal-to-noise-and-interference ratio, a set of channel state information, an amount of time of arrival, an angle of arrival, an angle of departure, a power delay profile, a power spectral density, a delay Doppler spectrum, an angle power spectrum, a beam power profile or other data.

Another aspect is the heterogenous sensor data is based on one or a combination of, a time stamp, an amount of temperature, an amount of a volume of sound, an amount of light, image data, video data, an amount of magnetic flux, an amount of output from an accelerometer, an amount of pressure, an amount of vibration, an amount of infrared red light, an amount of humidity, an amount of electrical power, an amount of particle concentration, an amount of odors, an amount of radiation or other data.

An aspect is that the heterogenous sensor data is obtained by one or a combination of, a vision/imaging sensor, a temperature sensor, a radiation sensor, a proximity sensor, a pressure sensor, a position sensor, a photoelectric sensor, a particle sensor, a motion sensor, a metal sensor, a level sensor, a leak sensor, a humidity sensor, a gas/chemical sensor, a force sensor, a flow sensor, a flaw sensor, a flame sensor, an electrical sensor, a contact sensor, a non-contact sensor or other sensor devices.

Another aspect is the estimated environmental state is determined for a time period, and includes one or a combination of, types of behavior of at least one object, states of at least one object, poses of at least one object or locations of at least one object. Wherein the at least one object is one of stationary, moving, a living thing, a non-living thing such as one or a combination of ambient furniture, ambient materials, ambient buildings, ambient plants, ambient pets, ambient computers, ambient robots, ambient users or the radio devices.

Another aspect is the environmental state includes one or a combination of: an activity of at least one living thing; at least one pose of an object or a living thing; an amount of objects or living things occupancy; an amount of objects or living things within an area of the environment; an amount of in-door traffic; a location of an object or a living thing; a location of an outdoor object or an outdoor living thing within a range of the radio devices; a robot or a non-living thing that is stationary or moving; a set of instructions associated with indoor navigation; or a set of instructions associated with indoor parking assistance.

Still another aspect is the parameterized model is based on a trained deep neural network, such that the deep neural network is trained either online via accessing a communication network. Or offline by accessing the stored measurement data to obtain at least one type of measurement from the first radio band and at least one type of measurement from the second radio band. Fuse the at least two types of measurements from the first and the second radio bands to generate a set of fused measurements. Input the set of fused measurements into the deep neural network, to generate an estimated environmental state in the environment. Compute a loss value based on a difference between the generated estimated environmental state and a stored estimated environmental state accessed from the stored measurement data. Update a set of trainable parameters of the deep neural network by a set of rules for training, wherein the set of rules for training is based on a gradient method. Wherein the deep neural network includes one or a combination of a first network block that encodes the set of fused measurements into an encoded vector depending if the two types of measurements to be fused are different types of measurement formats, such as asynchronous and uncoordinated measurement formats that are uniformly aligned. A second network block converts the encoded vector into a feature vector such that the feature vector is insensitive to the different types of measurement formats. A third network block generates the estimated environmental state based on the feature vector and the set of fused measurements. A fourth network block reconstructs the set of fused measurements from the feature vector. A fifth network block regularizes the feature vector for disentanglement in an adversarial fashion.

An aspect is the at least one type of measurement from the first radio band is mid-grained beam signal to noise ratio (SNR) measurements at a mmWave band of 60 GHz, and the at least one type of measurement from the second radio band is fine-grained channel state information (CSI) measurements at sub-6 GHz from multiple spatial streams, such that the fusion includes fusing the fine-grained CSI measurements at sub-6 GHz from multiple spatial streams with the fine-grained CSI measurements at sub-6 GHz from multiple spatial streams. Wherein the fine-grained CSI measurements include complex-valued amplitudes at orthogonal frequency-division multiplexing (OFDM) subcarrier tones, such that the fine-grained CSI measurements are equivalent to a power delay profile (PDP) in a time-domain and reflects a power distribution along propagation paths, and wherein the mid-grained beam SNRs provide spatial-domain channel measurements over multiple beamforming directions or beam spaces.

Another aspect is the coverage of the environmental states is automatic based upon generating the estimated environmental state. The computing processor via the executable programs is configured to access each module of the modules via the data storage, such that each module includes one or more predetermined rules. Iteratively, input the estimated environmental state into each model, to generate an output of either an alert action, or no action, if the alert action is generated by the module, implies at least one predetermined rule is violated, and the computing processor converts the alert action to an alert signal, sends the alert signal via the transceiver, to the communication network. Wherein the alert signal is received and inputted into an alert processing module associated with the system, to generate an output including one or more corrective actions with a set of instructions based on the estimated environmental state which is sent to a work team to complete. Wherein at least module is a proximity module that includes the steps of input the estimated environmental state into the proximity module to generate either a proximity alert action, or no proximity alert action, if the proximity alert (PA) action is generated, implies at least one predetermined proximity rule is violated such as an moving object in the environment has entered into a predetermine no object allowed designated area within the environment, and the computing processor converts the PA action to a PA signal, sends the PA signal via the transceiver, to the communication network. Wherein the PA signal is received and inputted into the alert processing module associated with the system, to generate an output including one or more corrective proximity actions with a set of instructions based on the estimated environmental state which is sent to a work team to complete, such that the one or more corrective proximity actions includes redirecting the moving object out of the predetermine no object allowed designated area.

Another aspect is further comprising an autoencoder-based fusion network having separate encoders and decoders, such that the autoencoder-based fusion network is first trained using a reconstruction error generated from outputs of at least two decoders that the set of fused measurements into the at least two decoders. Then, upon the autoencoder-based fusion network being trained, the at least two types of measurements from the first and the second radio bands are fed into the trained encoders and fusion block to generate the set of fused features.

Still another aspect is each estimated environmental state for each time period over multiple time periods determines a position of at least one object or living thing within the environment, and each estimated environmental state is displayed on a display device to provide a visual tracking indication of the determined position of the at least one object or the living thing for that time period.

An aspect is an executable program includes instructions to coordinate the at least one radio device using the multiple antenna elements over the first communication channel at the first radio band with the other radio devices included instructions using their respective multiple antenna elements over the first communication channel at the first radio band, which when executed by the computing processor, cause the at least one radio device to coordinate time synchronization with the other radio devices.

Another aspect is the stored data includes values indicative of signal to noise ratio (SNR) measurements of a set of beams emitted at different beam angles by the phased antenna array and measured at a set of locations, that provide for a mapping between different combinations of SNR values of the set of beams and the set of locations, such that a location from the set of locations is for a period of time mapped to a unique combination of the SNR values of the set of beams, and further provides information associated with types of behavior of the device at the location for that period of time, poses of the device at the location for that period of time, locations of physical objects in the environment for that period of time, and types of behavior of ambient users in the environment for that period of time.

Still an aspect is stored data include values indicative of link attributes including one of beam received signal strength indicator (RSSI) measurements, beam channel state information (CSI) measurements, beam patterns or beam sequencing, wherein each link attribute includes measurements of a set of beams emitted at different beam angles by the phased array of antennas and measured at a set of locations in the environment, wherein the stored values provide a mapping between different combinations of at least one link attribute values of the set of beams and the set of locations, such that a location from the set of locations is mapped to a unique combination of the at least one link attribute values of the set of beams. Wherein the link attributes further include one or a combination of RSSI measurements or CSI measurements.

An aspect includes using a communication system having beamforming transmission in a millimeter wave spectrum in an environment, that includes a phased antenna array configured to perform beamforming to establish millimeter wave channel links with devices at different locations in the environment. The method including performing a beam training with a target device located in an environment to estimate SNR measurement values for different beams transmitted over the different beam angles using control circuitry connected with the antennas. The control circuitry is configured for selecting, in response to the beam training, at least one dominant angle for a beamforming communication with the target device. Accessing a memory connected to the phased antenna array, the memory having stored data. The stored data include values indicative of SNR measurements of a set of beams emitted at different beam angles by the phased antenna array and measured at a set of locations in the environment. Wherein the stored values provide a mapping between different combinations of SNR values of the set of beams and the set of locations. Such that a location from the set of locations is mapped to a unique combination of the SNR values of the set of beams. Estimating from the mapping stored in the memory, a location of the target device corresponding to the SNR values for different beams estimated during the beam training. Transmitting the estimated location of the target device using the phased antenna array via a beamforming transmission over the at least one dominant angle.

Wherein another aspect is the stored data from data storage includes fingerprinting data, the fingerprinting data includes each location from the set of locations mapped to the unique combination of the SNR values of the set of beams for a period of time, such that the unique combination of the SNR values of the set of beams at that period of time further provides information associated with types of behavior of the device at the location for that period of time, poses of the device at the location for that period of time, locations of physical objects in the environment for that period of time, and types of behavior of ambient users in the environment for that period of time.

Some aspects include a communication system using beamforming transmission in a millimeter wave spectrum in an environment, that includes a phased antenna array configured to perform beamforming to establish millimeter wave channel links with devices at different locations in the environment. The communication system including a memory connected to the phased antenna array, having stored data. The stored data include values indicative of signal to noise ratio (SNR) measurements of a set of beams emitted at different beam angles by the phased antenna array and measured at a set of locations, that provide for a mapping between different combinations of SNR values of the set of beams and the set of locations. Such that a location from the set of locations is mapped to a unique combination of the SNR values of the set of beams. Control circuitry communicatively connected with the phased antenna array and the memory, configured to perform a beam training with a target device located in the environment to estimate SNR values for different beams transmitted over the different beam angles. Select, in response to the beam training, at least one dominant angle for a beamforming communication with the target device. Estimate from the mapping stored in the memory, a location of the target device corresponding to the SNR values for different beams estimated during the beam training. Transmit the estimated location of the target device using the phased antenna array via a beamforming transmission over the at least one dominant angle.

Wherein, other aspect can include the stored data include each location from the set of locations that is mapped to the unique combination of the SNR values of the set of beams for a period of time, such that the unique combination of the SNR values of the set of beams at that period of time further provides information associated with types of behavior of the device at the location for that period of time, poses of the device at the location for that period of time, locations of physical objects in the environment for that period of time, and types of behavior of ambient users in the environment for that period of time.

Definitions

According to aspects of the present disclosure, and based on experimentation, the following definitions have been established, and certainly are not a complete definition of each phrase or term. Wherein the provided definitions are merely provided as an example, based upon learnings from experimentation, wherein other interpretations, definitions, and other aspects may pertain. However, for at least a mere basic preview of the phrase or term presented, such definitions have been provided.

Phased Array: A phased array is two or more antennas used together to provide some desired characteristic or feature not available with a single antenna. For instance, each of antennas (60 GHz) 12, 412, 512, 612, 712 illustrated in FIGS. 1A, 4A, 5A, 6A are 7A can be a phase array antenna. An array is usually a collection of multiple antennas arranged in a matrix of rows and columns or some other pattern. A review of a radiation pattern of a basic dipole includes a figure eight (8) pattern that causes most power to be radiated broadside from an antenna element and also some in other directions, except in those directions at the ends of the antenna elements. However, by using multiple antennas in an array, i.e. a phased array, the radiation pattern can be shaped into a narrower beam as shown in the figure below. This pattern or lobe is made up of multiple signals from multiple antennas in the array, i.e. phased array. The signals are focused, making them stronger and allowing the beam to be pointed in a desired direction. For example, some benefits of using the phased array can be to achieve some needed features. Some of these key features may be: Directivity, directivity can imply that the antenna is more effective in one direction or another. Directivity means that the signal is narrowly focused in one direction. This focusing of the signal is what creates the antenna gain. As the figure above showed the broad radiation pattern of a standard dipole and the radiation pattern (or sector, lobe) of a phased array. Gain is like amplification. Some types of antennas boost the signal level or effective radiated power (ERP) as if greater signal power is used. Gain applies to both transmitting and receiving. Interference minimization, Pointing the antenna in a particular direction means that it's less effective in the other directions. This feature helps eliminate or reduce interference for signals coining in from other directions. Nulls can be created to take out undesirable signals. Steerable, phased arrays can be adjusted to reposition a lobe on-the-fly. The direction of the signal can be changed electronically to optimize the gain. This allows them to scan horizontally and/or vertically. Phased arrays implement what we call beamforming. This is done by taking the radiation patterns of each of the antennas in the array and adding them together in such a way that they concentrate the energy into a narrow beam or lobe. The individual antenna signals are said to be interfering with one another either constructively or destructively. Some signals combine to form a stronger composite signal, while others partially cancel one another out.

Figure 9A:
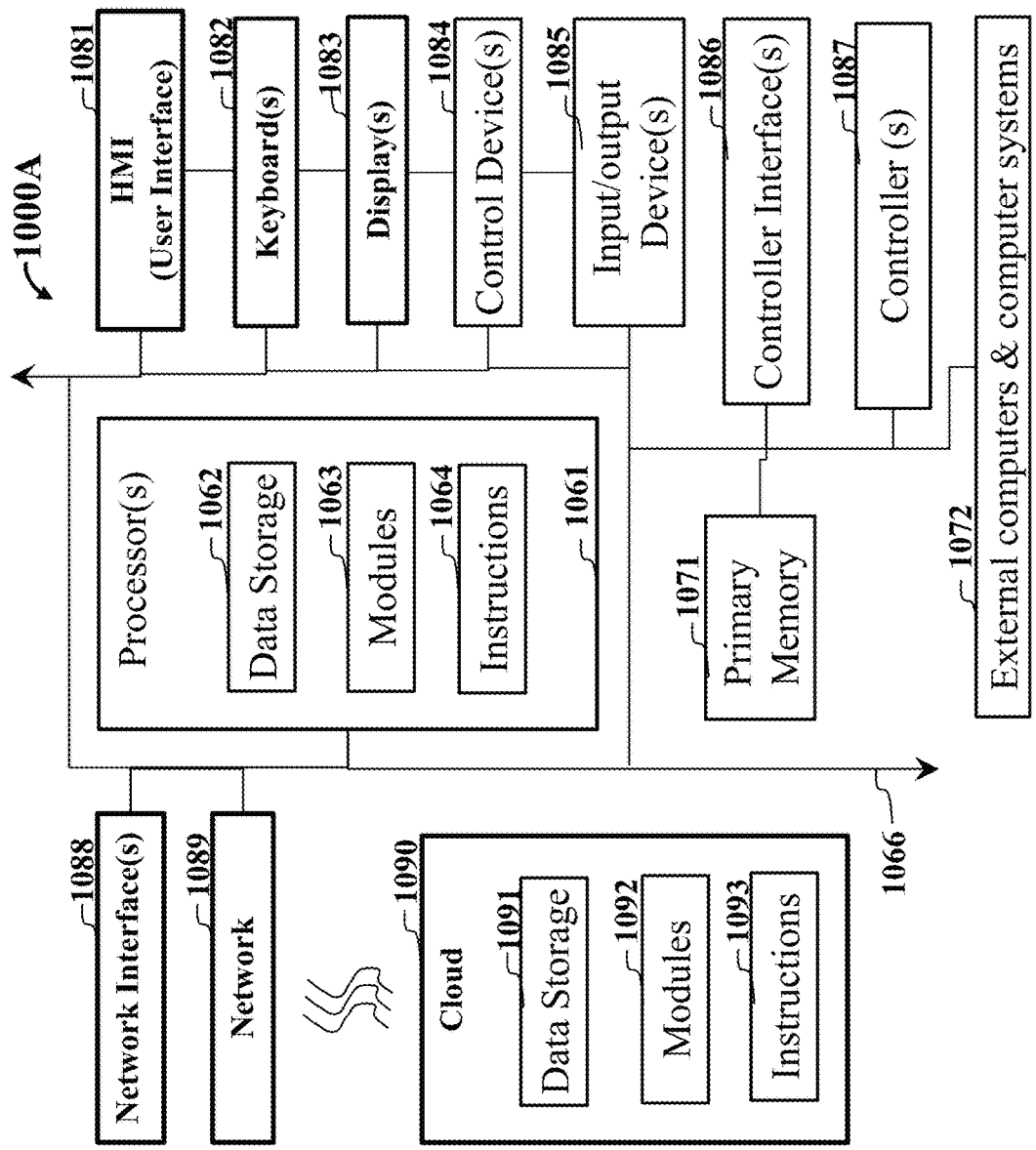
FIG. 9A is a diagram illustrating some components of a processing system that may use with some operations embodiments of the present disclosure, according to some embodiments of the present disclosure.

FIG. 9A is a diagram of some components of a processing system that can be used with some operations for one or all embodiments of the present disclosure, according to some embodiments of the present disclosure. The processing system 1000A is inter-connected via a bus system 1066 that interconnects components of the system. The system 1000A can include one or more central processing units ("processors") 1061. The processor 1061 can be a server computer, a third party computer, a personal computer (PC), a client computer, a user device, a tablet PC, a laptop computer, a cellular telephone, a smart phone, a web device, a network router, switch or bridge, a console, or any machine configured for executing instructions according actions taken by the computing system. Further, the processing system 1000A can include data storage 1062, stored modules 1063 and sets of instructions 1064.

The processing system 1000A can include a primary memory 1071, that can include other types of memory (not shown) such as databases, non-volatile memory machine-readable medium, servers, etc., depending upon a user's requirements and operational components. The primary memory along with the above noted components can store instructions, applications, programs, modules, computer programs, all of which can be carried out by one or more processors of the system.

Still referring to FIG. 9A, the system 1000A can include a Human-Machine Interface (HMI) 1081 that is a user interface or dashboard that connects a person to a machine, system, or device. Other terms for HMI can be Man-Machine Interface (MMI), Operator Interface Terminal (OIT), Local Operator Interface (LOI), or Operator Terminal (OT). HMI and Graphical User Interface (GUI) are similar, such that GUIs are often leveraged within HMIs for visualization capabilities. The HMI can be used to visually display data, track production time, trends, and tags, oversee KPIs, monitor machine inputs and outputs, depending upon a user's system and operational requirements. Some components may be directed connected to the HMI or to a bus system 1066 can be keyboards 1082, displays 1083, control devices 1084 and input/output devices 1085, and like other components associated with the above noted terms that are known to operate in particular industries.

Other components of the system 1000A can include controller interfaces 1086, controllers 1087, external computers and computer systems 1072, network interfaces 1088 and at least one network 1089. The network interfaces 1088 can include a network adapter that assists with the processing system 1000A to manage data in the network 1089 with an entity that can be, but not required, external to the processing system 1000A (i.e. network appliances, etc.), as typically configured through any known and/or convenient communications protocol supported by the processing system 1000A and the external entity. The network adapter 1089 can include network adaptor cards, a wireless network interface card, a router, an access point, a wireless router, a switch, multilayer switches, protocol converters, gateways, bridges, bridge routers, hubs, digital media receivers, and/or repeaters. The network adapter 1089 can include a firewalls which can govern and/or manage permission to access data in computer networks, and track levels of trust between different machines and/or applications. The firewalls can be any number of modules having any combination of hardware and/or software components able to enforce a predetermined set of access rights between a particular set of machines and applications, machines and machines, and/or applications and applications. For example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Still referring to FIG. 9A, the network 1089 can include a communication system that communicates wirelessly or can be wired to other components such as appliances, machines, etc., that can be used with the embodiments of the present disclosure. For example, the network 1089 can communication with a cloud 1090, the cloud 1090 can include data storage 1091, modules, 1092 and sets of instructions 1093, as well as other components and aspects that is known in the cloud understandings within the cloud industries. Noted, is that the bus system 1066 can be separate buses, specific connections from one component or sub-system to another, or both connected by bridges, adapters, or controllers. The bus 1066, maybe configured for relaying data packets between components of a network appliance (i.e. network ports, other ports, etc.).

Figure 9B:
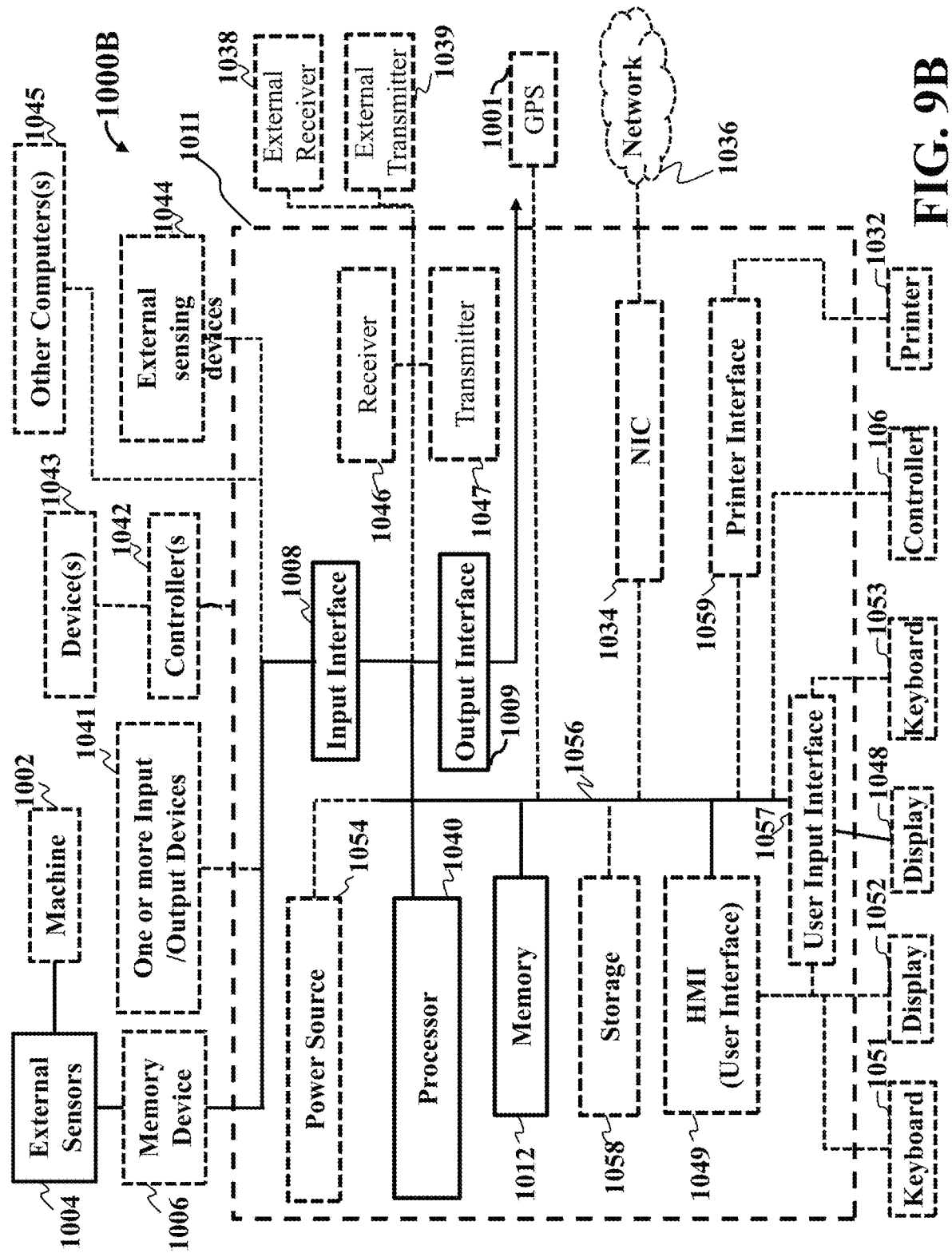
FIG. 9B is a block diagram illustrating some components of a computer that can be used with, or in combination with, some or all components of FIG. 9A, according to some embodiments of the present disclosure.

FIG. 9B is a block diagram of illustrating some components of a computer that can be used with or in combination with some or all components of FIG. 9A, according to some embodiments of the present disclosure. The components 1000B can include a computer 1011 having a processor 1040, computer readable memory 1012, storage 1058 and user interface 1049 with display 1052 and keyboard 1051, which are connected through bus 1056. For example, the user interface 1064 in communication with the processor 1040 and the computer readable memory 1012 acquires and stores the data in the computer readable memory 1012 upon receiving an input from a surface, keyboard 1053, of the user interface 1057 by a user.

The computer 1011 can include a power source 1054; depending upon the application the power source 1054 may be optionally located outside of the computer 1011. Linked through bus 1056 can be a user input interface 1057 adapted to connect to a display device 1048, wherein the display device 1048 can include a computer monitor, camera, television, projector, or mobile device, among others. A printer interface 1059 can also be connected through bus 1056 and adapted to connect to a printing device 1032, wherein the printing device 1032 can include a liquid inkjet printer, solid ink printer, large-scale commercial printer, thermal printer, UV printer, or dye-sublimation printer, among others. A network interface controller (NIC) 1034 is adapted to connect through the bus 1056 to a network 1036, wherein data or other data, among other things, can be rendered on a third party display device, third party imaging device, and/or third party printing device outside of the computer 1011. The computer/processor 1011 can include a GPS 1001 connected to bus 1056.

Still referring to FIG. 9B, the data or other data, among other things, can be transmitted over a communication channel of the network 1036, and/or stored within the storage system 1058 for storage and/or further processing. Further, the time series data or other data may be received wirelessly or hard wired from a receiver 1046 (or external receiver 1038) or transmitted via a transmitter 1047 (or external transmitter 1039) wirelessly or hard wired, the receiver 1046 and transmitter 1047 are both connected through the bus 1056. The computer 1011 may be connected via an input interface 1008 to external sensing devices 1044 and external input/output devices 1041. The input interface 1008 can be connected to one or more input/output devices 1041, external memory 1006, external sensors 1004, which may be connected to a machine-like device 1002. A controller(s) 1042 can be connected to device(s) 1043. Further, other computer(s) 1045 can be connected to the bus 1056). For example, the external sensing devices 1044 may include sensors gathering data before-during-after of the collected time-series data of the machine. The computer 1011 may be connected to other external computers 1042. An output interface 1009 may be used to output the processed data from the processor 1040. It is noted that a user interface 1049 in communication with the processor 1040 and the non-transitory computer readable storage medium 1012, acquires and stores the region data in the non-transitory computer readable storage medium 1012 upon receiving an input from a surface 1052 of the user interface 1049 by a user. Further, a controller 1061 can be connected to the bus 1056, to control devices associated with the embodiments of the systems and methods of the present disclosure.

Additional Features of Other Embodiments

The other additional embodiments of the present invention can provide a Multi-Band Wi-Fi Fusion system for WLAN Sensing that are represented by the following additional features.

Additional Feature 1: The system may include a multi-band wireless network comprising a set of radio devices to provide coverage in an environment, wherein the set of radio devices are configured to establish wireless communication or sensing links over multi-band wireless channels, wherein the multi-band wireless channels use a first radio band at a millimeter wavelength and a second radio band at a centimeter wavelength; a computing processor communicatively coupled to the set of radio devices and a data storage, wherein the data storage has data comprising a parameterized model, modules and executable programs, which when executed, cause the computing processor to: receive measurement data over the multi-band wireless channels to obtain a set of heterogeneous sensor data, network transferred data, or wireless channel attribute data; fuse at least two types of measurements from the first and the second radio bands at one or more steps in a parameterized model to generate an estimated environmental state in the environment.

Additional Feature 2: The system of Additional Feature 1, wherein the wireless channel attribute data is based on one or a combination of, an amount of a signal strength, an amount of a noise strength, an amount of an interference strength, an amount of a signal-to-noise ratio, an amount of a signal-to-noise-and-interference ratio, a set of channel state information, a set of channel impulse response, a set of channel frequency response, an amount of time of arrival, an angle of arrival, an angle of departure, a power delay profile, a power spectral density, a delay Doppler spectrum, an angle power spectrum, a beam power profile or other data.

Additional Feature 3: The system of Additional Feature 1, wherein the heterogenous sensor data is based on one or a combination of, a time stamp, an amount of temperature, an amount of a volume of sound, an amount of light, image data, video data, an amount of magnetic flux, an amount of output from an accelerometer, an amount of pressure, an amount of vibration, an amount of infrared red light, an amount of humidity, an amount of electrical power, an amount of particle concentration, an amount of odors, an amount of radiation or other data.

Additional Feature 4: The system of Additional Feature 1, wherein the heterogenous sensor data is obtained by one or a combination of, a vision/imaging sensor, a temperature sensor, a radiation sensor, a proximity sensor, a pressure sensor, a position sensor, a photoelectric sensor, a particle sensor, a motion sensor, a metal sensor, a level sensor, a leak sensor, a humidity sensor, a gas/chemical sensor, a force sensor, a flow sensor, a flaw sensor, a flame sensor, an electrical sensor, a contact sensor, a non-contact sensor or other sensor devices.

Additional Feature 5: The system of Additional Feature 1, wherein the estimated environmental state is determined for a time period, and comprises one or a combination of, types of behavior of at least one object, states of at least one object, poses of at least one object or locations of at least one object.

Additional Feature 6: The system of Additional Feature 5, wherein the at least one object is one of stationary, moving, a living thing, a non-living thing such as one or a combination of ambient furniture, ambient materials, ambient buildings, ambient plants, ambient pets, ambient computers, ambient robots, ambient users or the radio devices.

Additional Feature 7: The system of Additional Feature 1, wherein the environmental state comprises one or a combination of: an activity of at least one living thing; at least one pose of an object or a living thing; an amount of objects or living things occupancy; an amount of objects or living things within an area of the environment; an amount of in-door traffic; a location of an object or a living thing; a location of an outdoor object or an outdoor living thing within a range of the radio devices; a robot or a non-living thing that is stationary or moving; a set of instructions associated with indoor navigation; or a set of instructions associated with indoor parking assistance.

Additional Feature 8: The system of Additional Feature 1, wherein the parameterized model is based on a trained deep neural network, such that the deep neural network is trained either online via accessing a communication network, or offline by: access the stored measurement data to obtain at least one type of measurement from the first radio band and at least one type of measurement from the second radio band; fuse the at least two types of measurements from the first and the second radio bands to generate a set of fused results; input the set of fused results into the deep neural network, to generate an estimated environmental state in the environment; compute a loss value based on a difference between the generated estimated environmental state and a stored estimated environmental state accessed from the stored measurement data; and update a set of trainable parameters of the deep neural network by a set of rules for training, wherein the set of rules for training is based on a gradient method.

Additional Feature 9: The system of Additional Feature 8, wherein the deep neural network comprises one or a combination of: a first network block that encodes the set of fused results into an encoded vector depending if the two types of measurements to be fused are different types of measurement formats, such as asynchronous and uncoordinated measurement formats that are uniformly aligned; a second network block converts the encoded vector into a feature vector such that the feature vector is insensitive to the different types of measurement formats; a third network block generates the estimated environmental state based on the feature vector and the set of fused measurements; a fourth network block reconstructs the set of fused measurements from the feature vector.

Additional Feature 10: The system of Additional Feature 1, wherein the at least one type of measurement from the first radio band is mid-grained beam signal to noise ratio (SNR) measurements at a millimeter band of 60 GHz, and the at least one type of measurement from the second radio band is fine-grained channel state information (CSI) measurements at sub-6 GHz from multiple spatial streams. [which one is millimeter wavelength and a centimeter wavelength]

Additional Feature 11: The system of Additional Feature 10, wherein the fine-grained CSI measurements include complex-valued amplitudes at orthogonal frequency-division multiplexing (OFDM) subcarrier tones, such that the fine-grained CSI measurements are equivalent to a power delay profile (PDP) in a time-domain and reflects a power distribution along propagation paths, and wherein the mid-grained beam SNRs provide spatial-domain channel measurements over multiple beamforming directions or beam spaces.

Additional Feature 12: The system of Additional Feature 1, wherein the coverage of the environmental states is automatic based upon generating the estimated environmental state, the computing processor via the executable programs is configured to: access each module of the modules via the data storage, such that each module includes one or more predetermined rules; iteratively, input the estimated environmental state into each module, to generate an output of either an alert action, or no action, if the alert action is generated by the module, implies at least one predetermined rule is violated, and the computing processor converts the alert action to an alert signal, sends the alert signal via the transceiver, to the communication network, wherein the alert signal is received and inputted into an alert processing module associated with the system, to generate an output including one or more corrective actions with a set of instructions based on the estimated environmental state which is sent to a work team to complete.

Additional Feature 13: The system of Additional Feature 12, wherein at least module is a proximity module that includes the steps of: input the estimated environmental state into the proximity module to generate either a proximity alert action, or no proximity alert action, if the proximity alert (PA) action is generated, implies at least one predetermined proximity rule is violated such as an moving object in the environment has entered into a predetermine no object allowed designated area within the environment, and the computing processor converts the PA action to a PA signal, sends the PA signal via the transceiver, to the communication network, wherein the PA signal is received and inputted into the alert processing module associated with the system, to generate an output including one or more corrective proximity actions with a set of instructions based on the estimated environmental state which is sent to a work team to complete, such that the one or more corrective proximity actions includes redirecting the moving object out of the predetermine no object allowed designated area.

Additional Feature 14: The system of Additional Feature 1, further includes: an autoencoder-based fusion network having separate encoders and decoders, such that the autoencoder-based fusion network is first trained using a reconstruction error generated from outputs of at least two decoders that the set of fused results into the at least two decoders; then, upon the autoencoder-based fusion network being trained, the at least two types of measurements from the first and the second radio bands are, which an output is are fused together, to generate the set of fused results.

Additional Feature 15: The system of claim 1, wherein the obtained at least one type of measurement from the first radio band are signals indicative of an estimated distance between an object or a living thing and a particular wireless radio, the distance estimated is based on any of: a time of arrival (ToA) of a wireless communication between the object or the living thing and the particular wireless radio; a round trip time (RTT) of a wireless communication between the object or the living thing and the particular wireless radio; or a received signal strength (RSS) of a wireless communication between the object or the living thing and the particular wireless radio.

Additional Feature 16: The system of Additional Feature 1, wherein the obtained at least one type of measurement from the second radio band are signals indicative of an estimated distance between an object or a living thing and a particular wireless radio, the distance estimated is based on any of: a time of arrival (ToA) of a wireless communication between the object or the living thing and the particular wireless radio; a round trip time (RTT) of a wireless communication between the object or the living thing and the particular wireless radio; or a received signal strength (RSS) of a wireless communication between the object or the living thing and the particular wireless radio.

Additional Feature 17: The system of Additional Feature 1, wherein each estimated environmental state for each time period over multiple time periods determines a position of at least one object or living thing within the environment, and each estimated environmental state is displayed on a display device to provide a visual tracking indication of the determined position of the at least one object or the living thing for that time period.

Additional Feature 18: The system of Additional Feature 1, wherein an executable program includes instructions to coordinate the at least one wireless radio using the multiple antenna elements over the first communication channel at the first radio band with the other wireless radio included instructions using their respective multiple antenna elements over the first communication channel at the first radio band, which when executed by the computing processor, cause the at least one wireless radio to coordinate time synchronization with the other wireless radio.

Additional Feature 19: The system of Additional Feature 1, wherein the stored data includes values indicative of signal to noise ratio (SNR) measurements of a set of beams emitted at different beam angles by the phased antenna array and measured at a set of locations, that provide for a mapping between different combinations of SNR values of the set of beams and the set of locations, such that a location from the set of locations is for a period of time mapped to a unique combination of the SNR values of the set of beams, and further provides information associated with types of behavior of the wireless radio at the location for that period of time, poses of the device at the location for that period of time, locations of physical objects in the environment for that period of time, and types of behavior of ambient users in the environment for that period of time.

Additional Feature 20: The system of Additional Feature 1, wherein stored data include values indicative of link attributes including one or a combination of, beam received signal strength indicator (RSSI) measurements, beam channel state information (CSI) measurements, beam patterns or beam sequencing, such that each link attribute includes measurements of a set of beams emitted at different beam angles by the phased array of antennas and measured at a set of locations in the environment, and wherein the stored values provide a mapping between different combinations of at least one link attribute values of the set of beams and the set of locations, such that a location from the set of locations is mapped to a unique combination of the at least one link attribute values of the set of beams.

Additional Feature 21: The system of Additional Feature 1, wherein the stored data from data storage includes fingerprinting data, the fingerprinting data includes each location from the set of locations mapped to the unique combination of the SNR values of the set of beams for a period of time, such that the unique combination of the SNR values of the set of beams at that period of time further provides information associated with types of behavior of the device at the location for that period of time, poses of the device at the location for that period of time, locations of physical objects in the environment for that period of time, and types of behavior of ambient users in the environment for that period of time.

Additional Feature 22: A system including a multi-band wireless network having radio devices to provide coverage to environmental states in an environment, wherein the radio devices are configured to establish wireless links over multi-band wireless channels, comprising: at least one first radio device uses multiple antenna elements over a first communication channel at a first radio band at millimeter wavelengths, that generates wireless channel measurements including one of, (a) values indicative of link qualities of a set of beams emitted at different beam angles from one or more antenna elements, (b) values indicative of link qualities of a set of frequency sub-carriers from one or more antenna elements, or (c) values indicative of link qualities of a set of time delays from one or more antenna elements; at least one second radio device uses a second communication channel at a second radio band at centimeter wavelengths, that generates wireless channel measurements including one of, (a) values indicative of link qualities of a set of beams emitted at different beam angles from one or more antenna elements, (b) values indicative of link qualities of a set of frequency sub-carriers from one or more antenna elements, or (c) values indicative of link qualities of a set of time delays from one or more antenna elements; a computing processor communicatively coupled to the first and the second at least one radio device and data storage, the data storage having data including a parameterized model, and executable programs stored thereon, which when executed, cause the computing processor to receive measurement data over the first and the second communication channels to obtain at least one type of measurements from the first radio band and at least one type of measurement from the second radio band, wherein the measurement data includes one or a combination of heterogeneous sensor data, WiFi data or wireless channel attribute data; fuse the at least two types of measurements from the first and the second radio bands at one or more processing steps in the parametrized model that includes one or a combination of, input fusion, feature fusion or output fusion, to generate a set of fused results; and input the set of fused results into the parameterized model to generate an estimated environmental state in the environment.

Additional Feature 23: A wireless radio device configured to operate in conjunction with other wireless radio devices in forming a multi-band wireless network, that establishes wireless links to transfer data over multi-band channels to assist in providing coverage to environmental states in an environment, the wireless radio device comprising: a first transceiver configured to communicate uses multiple antenna elements over a first communication channel at a first radio band at millimeter wavelengths, and a second transceiver configured to communicate over a second communication channel at a second radio band at centimeter wavelengths; a computing processor communicatively coupled to the first transceiver, the second transceiver, and data storage, the data storage having data including a parameterized model, and executable programs and modules stored thereon, which when executed, cause the computing processor to receive measurement data over the first and the second communication channels to obtain at least one type of measurements from the first radio band and at least one type of measurement from the second radio band, wherein the measurement data includes one or a combination of heterogeneous sensor data, WiFi data or wireless channel attribute data; fuse the at least two types of measurements from the first and the second radio bands at one or more processing steps in the parametrized model that includes one or a combination of, input fusion, feature fusion, or output fusion, to generate a set of fused measurements; and input the set of fused measurements into the parameterized model to generate an estimated environmental state in the environment.

Additional Feature 24: The system of Additional Feature 23, wherein the at least one type of measurement from the first radio band is mid-grained beam signal to noise ratio (SNR) measurements, and the at least one type of measurement from the second radio band is fine-grained channel state information (CSI) measurements.

Additional Feature 25: A wireless radio device configured to operate in conjunction with other wireless radio devices in forming a multi-band wireless network, that establishes wireless links to transfer data over multi-band channels to assist in providing coverage to environmental states in an environment, the wireless radio device comprising: a first transceiver configured to communicate uses multiple antenna elements over a first communication channel at a first radio band at millimeter wavelengths, that generates wireless channel measurements from multiple spatial streams including values indicative of link qualities from one or more antenna elements of the other wireless radio devices; a second transceiver configured to communicate over a second communication channel at a second radio band at centimeter wavelengths, that generates wireless channel measurements including values indicative of link qualities from one or more antenna elements of the other wireless radio devices; a computing processor communicatively coupled to the first transceiver, the second transceiver, and data storage, the data storage having data including a parameterized model, and executable programs and modules stored thereon, which when executed, cause the computing processor to receive measurement data over the first and the second communication channels to obtain at least one type of measurements from the first radio band and at least one type of measurement from the second radio band, wherein the measurement data includes one or a combination of heterogeneous sensor data, WiFi data or wireless channel attribute data; fuse the at least two types of measurements from the first and the second radio bands at one or more processing steps in the parametrized model that includes one or a combination of, input fusion, feature fusion, or output fusion, to generate a set of fused measurements; and input the set of fused measurements into the parameterized model to generate an estimated environmental state in the environment.

The description above provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A system for estimating a state of an environment comprising:
    at least one processor; and
    memory having instructions stored thereon that, when executed by the at least one processor, cause the system to:
    receive multi-channel information of a multi-band Wi-Fi transmission that provides Wi-Fi coverage of the environment, the multi-channel information including one or multiple properties of a centimeter-wavelength channel of the multi-band Wi-Fi transmission and one or multiple properties of a millimeter-wavelength channel of the multi-band Wi-Fi transmission;
    determine the state of the environment using jointly the one or multiple properties of the centimeter-wavelength channel and the one or multiple properties of the millimeter-wavelength channel, wherein the state of the environment includes one or more attributes of one or more devices communicating via the multi-band Wi-Fi transmission within the environment, and wherein to determine the state of the environment, the processor is configured to:
        extract first features from the one or multiple properties of the centimeter-wavelength channel;
        extract second features from the one or multiple properties of the millimeter-wavelength channel;
        fuse the extracted first features and the second features to produce fused features; and
        estimate the state of the environment, based on the fused features; and
    submit the state of the environment to a service provider to service the environment.

2. The system of claim 1, wherein the one or multiple properties of the centimeter-wavelength channel include channel state information (CSI) of the centimeter-wavelength channel and one or multiple properties of the millimeter-wavelength channel include signal-to-noise ratios (SNRs) of different spatial beams transmitted over the millimeter-wavelength channel with different angles of departure (AoD).

3. The system of claim 1, further comprising:
    a transceiver configured to receive the multi-channel information of the multi-band Wi-Fi transmission over a wireless communication channel.

4. The system of claim 1, wherein to determine the state of the environment, the processor is configured to execute a neural network including multiple subnetworks, wherein the subnetworks comprise:
    a first feature extraction subnetwork trained to perform the extraction of the first features from the one or multiple properties of the centimeter-wavelength channel;
    a second feature extraction subnetwork trained to perform the extraction of the second features from the one or multiple properties of the millimeter-wavelength channel;
    a fusion subnetwork trained to perform the fusion of the first features and the second features to produce the fused features; and
    a state estimator subnetwork trained to perform the estimation the state of the environment from the fused features.

5. The system of claim 4, wherein the neural network further comprises:
    a task executor subnetwork trained to execute a task for servicing the environment based on the state of the environment.

6. The system of claim 4, wherein the neural network is a multi-head neural network, the multi-head neural network comprising:
    multiple task executor subnetworks jointly trained for execution of different tasks, wherein each task executor subnetwork is trained to execute a corresponding task based on the state of the environment.

7. The system of claim 4, wherein the fusion subnetwork receives and combines each output of each layer of the first feature extraction subnetwork with each output of each layer of the second feature extraction subnetwork for subsequent processing over other layers of the fusion subnetwork iteratively reducing dimensionality of the combined outputs.

8. The system of claim 4, wherein the fusion subnetwork receives each output of each layer of the first feature extraction subnetwork and each output of each layer of the second feature extraction subnetwork and fuse all outputs together using an attention mechanism.

9. The system of claim 8, wherein the attention mechanism includes a module with a transformer architecture.

10. The system of claim 4, wherein at least some of the first feature extraction subnetwork, the second feature extraction subnetwork, the fusion subnetwork, and the state estimator subnetwork are trained based on an autoencoder architecture having an encoder and a decoder, wherein the first and the second feature extraction subnetworks form the encoder in the autoencoder architecture and the fusion subnetwork forms a latent space of the autoencoder architecture used for decoding.

11. The system of claim 10, wherein the decoder used to train the autoencoder architecture is disconnected during the execution of the neural network.

12. The system of claim 10, wherein the processor is configured to execute training of the neural network and execution of the neural network, wherein during the training, the processor trains the encoder and the decoder to encode properties of multi-band channels into the latent space and to decode the properties of the multi-band channels from the latent space, and wherein during the execution, the processor extracts the values of the latent space and submits the extracted values to the state estimation subnetwork.

13. The system of claim 1, further comprising the service provider configured to execute a task to change the state of the environment.

14. A Wi-Fi device comprising:
the system of claim 1; and
one or multiple Wi-Fi transceivers configured to transmit and receive Wi-Fi signals on different frequency bands including the centimeter-wavelength channel and the millimeter-wavelength channel,
wherein the system is operatively coupled to the Wi-Fi transceivers to receive the multi-channel information of the multi-band Wi-Fi transmission.

* * * * *